United States Patent
Kwon et al.

(10) Patent No.: US 10,523,789 B2
(45) Date of Patent: Dec. 31, 2019

(54) METHOD AND APPARATUS FOR TRANSMITTING/RECEIVING BROADCAST SIGNAL INCLUDING ROBUST HEADER COMPRESSION PACKET STREAM

(71) Applicant: LG ELECTRONICS INC., Seoul (KR)

(72) Inventors: Woosuk Kwon, Seoul (KR); Woosuk Ko, Seoul (KR); Sungryong Hong, Seoul (KR); Sejin Oh, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/105,333

(22) PCT Filed: Dec. 31, 2014

(86) PCT No.: PCT/KR2014/013107
§ 371 (c)(1),
(2) Date: Jun. 16, 2016

(87) PCT Pub. No.: WO2015/102406
PCT Pub. Date: Jul. 9, 2015

(65) Prior Publication Data
US 2017/0006139 A1  Jan. 5, 2017

Related U.S. Application Data

(60) Provisional application No. 61/923,246, filed on Jan. 3, 2014.

(51) Int. Cl.
*H04L 29/06* (2006.01)
*H04L 1/00* (2006.01)
(Continued)

(52) U.S. Cl.
CPC ............ *H04L 69/04* (2013.01); *H04L 1/0041* (2013.01); *H04L 1/0057* (2013.01);
(Continued)

(58) Field of Classification Search
CPC ..... H04W 28/065; H04W 4/06; H04W 28/06; H04L 1/0041; H04L 1/0057;
(Continued)

(56) References Cited

U.S. PATENT DOCUMENTS 6,967,694 B1   11/2005   Ninomiya et al.
6,967,964 B1   11/2005   Svanbro et al.
(Continued)

FOREIGN PATENT DOCUMENTS

CN      101656823 A    2/2010
JP      2005-229608 A  8/2005
(Continued)

OTHER PUBLICATIONS

Wikipedia, "Robust Header Compression," Apr. 1, 2019 https://en.wikipedia.org/wiki/Robust_Header_Compression.*

*Primary Examiner* — Maharishi V Khirodhar
*Assistant Examiner* — Kenneth P Hunt
(74) *Attorney, Agent, or Firm* — Dentons US LLP

(57) ABSTRACT

A method and apparatus for transmitting and receiving a broadcast signal including a robust header compression (RoHC) packet stream are disclosed. The broadcast signal transmitting method includes compressing a header of an IP packet included in an IP packet stream to generate an RoHC packet stream, extracting a first part of an RoHC packet included in the generated RoHC packet stream, converting a second part of the RoHC packet into another type of an RoHC packet, reconfiguring a new packet stream including the converted another type of the RoHC packet, transporting the reconfigured packet stream through a first channel, and
(Continued)

transporting the extracted first part through a second channel.

10 Claims, 33 Drawing Sheets

(51) Int. Cl.
    *H04L 12/931*     (2013.01)
    *H04W 28/06*     (2009.01)
    *H04W 4/06*     (2009.01)

(52) U.S. Cl.
    CPC .......... *H04L 1/0071* (2013.01); *H04L 1/0075* (2013.01); *H04L 49/201* (2013.01); *H04W 4/06* (2013.01); *H04W 28/065* (2013.01); *H04L 1/0079* (2013.01); *H04W 28/06* (2013.01)

(58) Field of Classification Search
    CPC ..... H04L 1/0071; H04L 1/0075; H04L 69/04; H04L 49/201; H04L 69/22
    See application file for complete search history.

(56) References Cited

U.S. PATENT DOCUMENTS

| | | | | |
|---|---|---|---|---|
| 7,512,716 | B2* | 3/2009 | Pelletier | H03M 7/30 709/236 |
| 2002/0141365 | A1* | 10/2002 | Leung | H04L 12/189 370/335 |
| 2007/0058679 | A1* | 3/2007 | Pelletier | H04W 28/06 370/477 |
| 2008/0151861 | A1* | 6/2008 | Zhang | H04L 1/0006 370/349 |
| 2009/0296624 | A1 | 12/2009 | Ryu et al. | |
| 2012/0113993 | A1* | 5/2012 | Sridhar | H04L 65/604 370/474 |
| 2012/0327955 | A1 | 12/2012 | Herrmann et al. | |
| 2013/0121345 | A1* | 5/2013 | Zhang | H04W 28/06 370/465 |
| 2013/0279380 | A1* | 10/2013 | Hong | H04H 20/72 370/310 |
| 2013/0291027 | A1 | 10/2013 | Hwang et al. | |

FOREIGN PATENT DOCUMENTS

| | | |
|---|---|---|
| KR | 10-2008-0066298 A | 7/2008 |
| KR | 10-2011-0086645 A | 7/2011 |
| KR | 10-2013-0127990 A | 11/2013 |

\* cited by examiner

[Fig. 1]
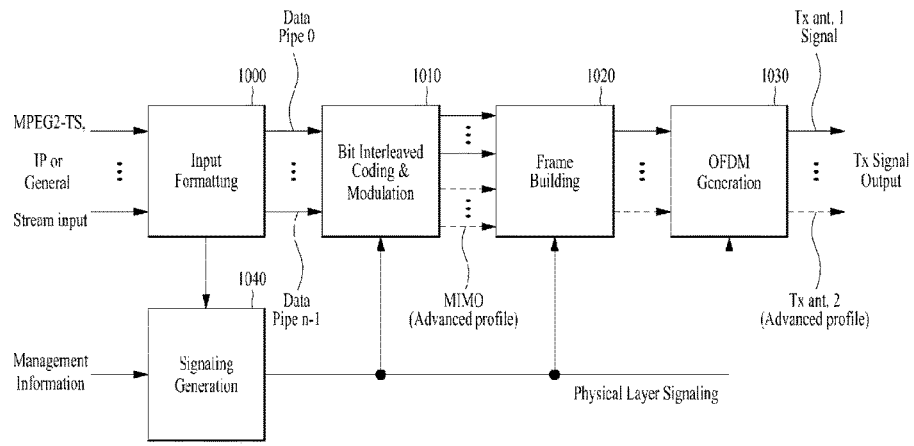
[Fig. 2]
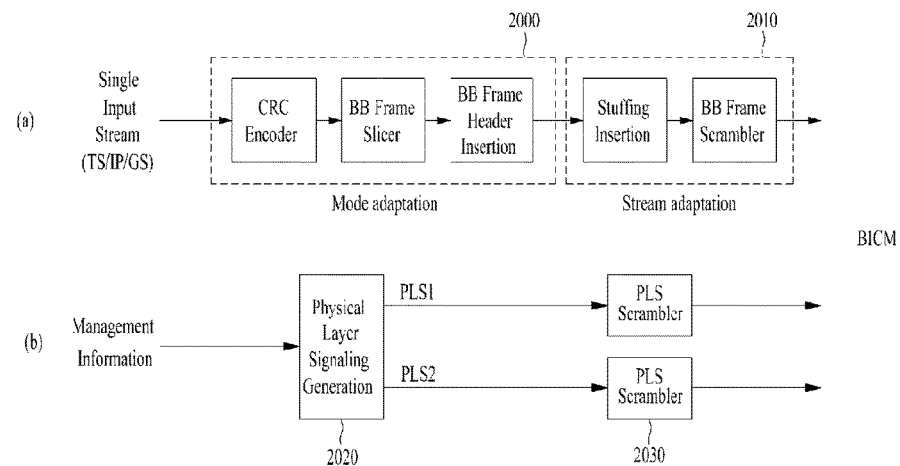
[Fig. 3]
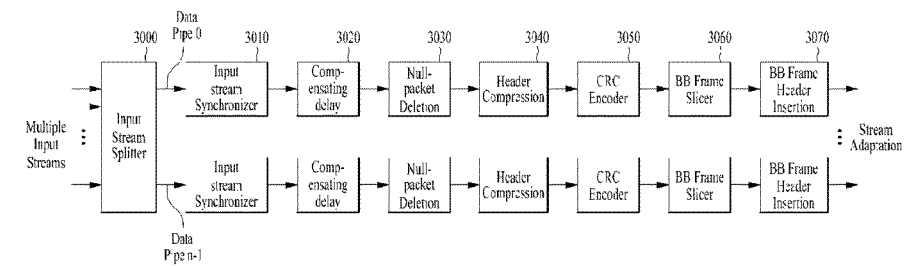

[Fig. 4]
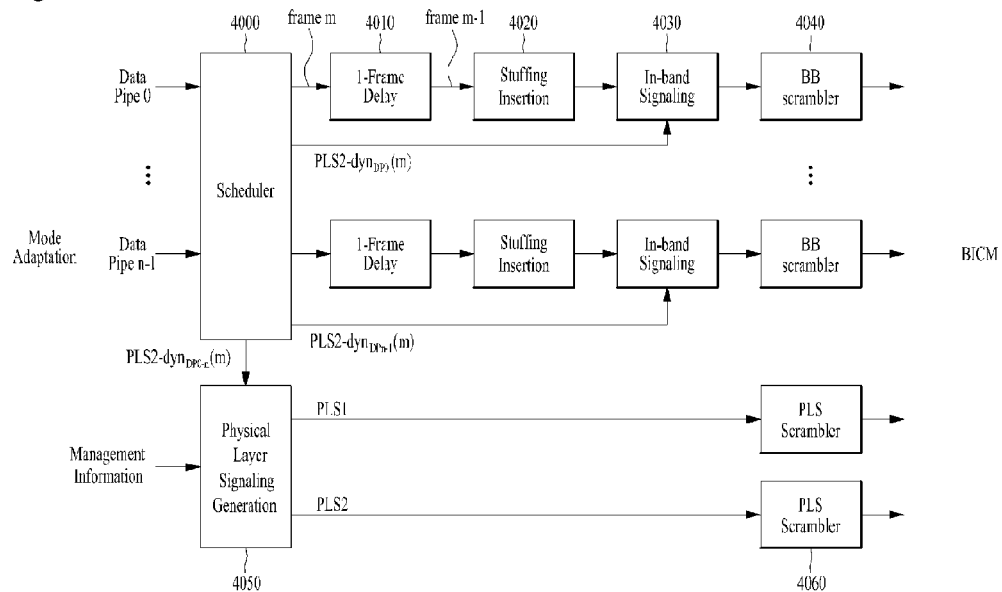
[Fig. 5]
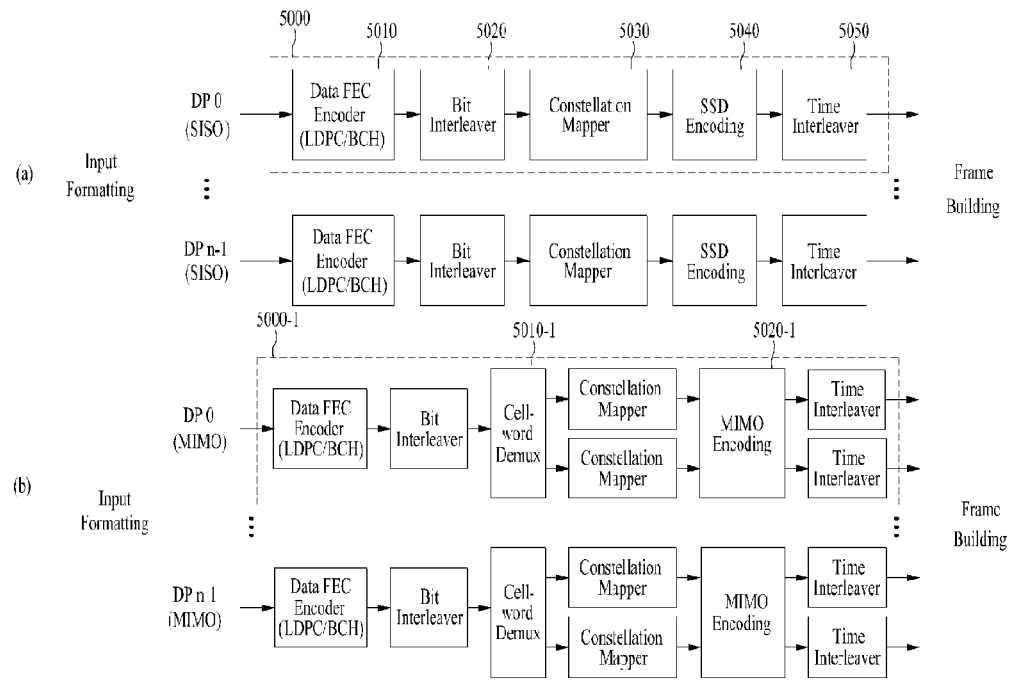

[Fig. 6]
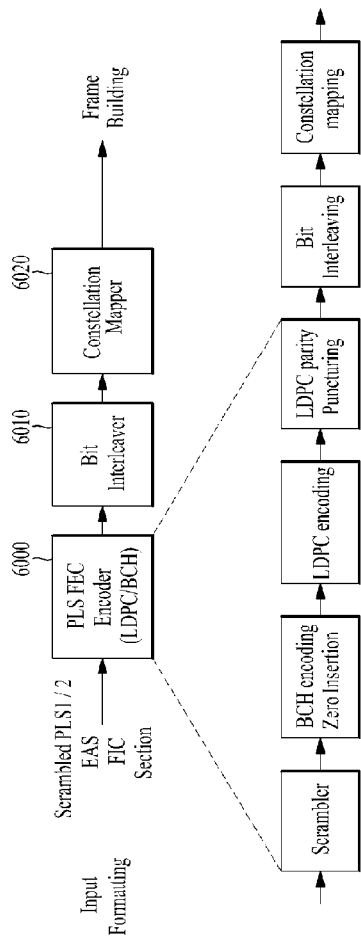
[Fig. 7]
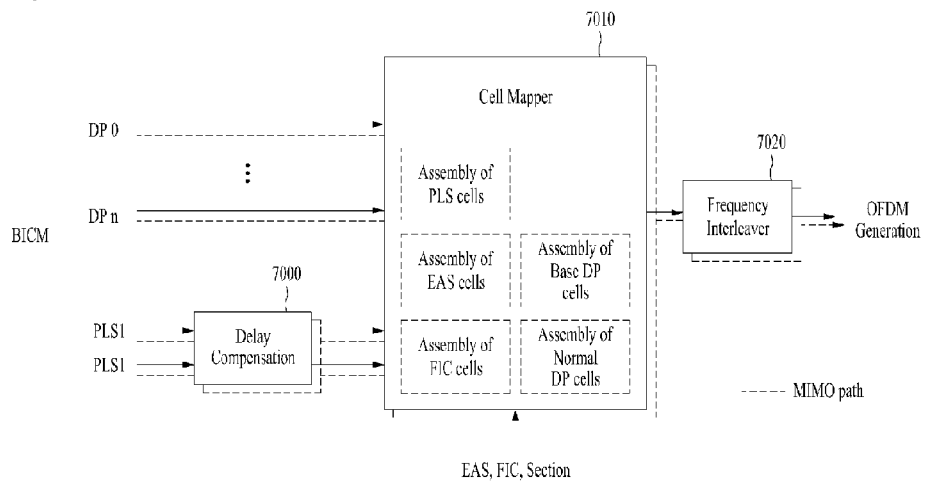

[Fig. 8]
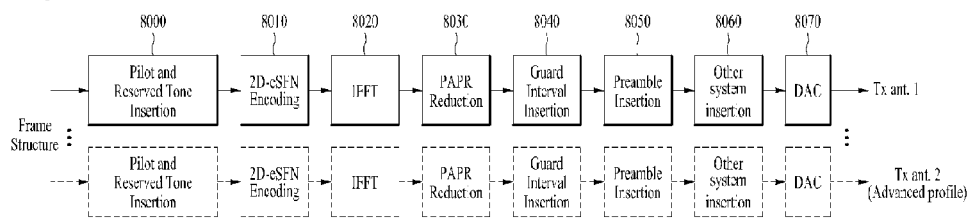
[Fig. 9]
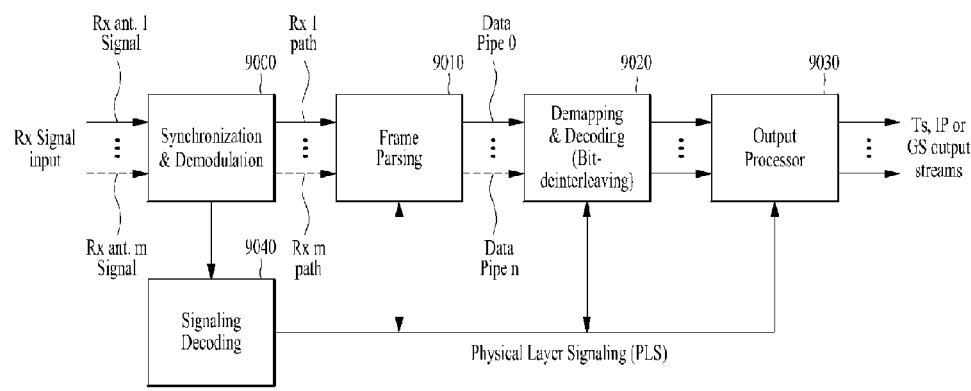

[Fig. 10]
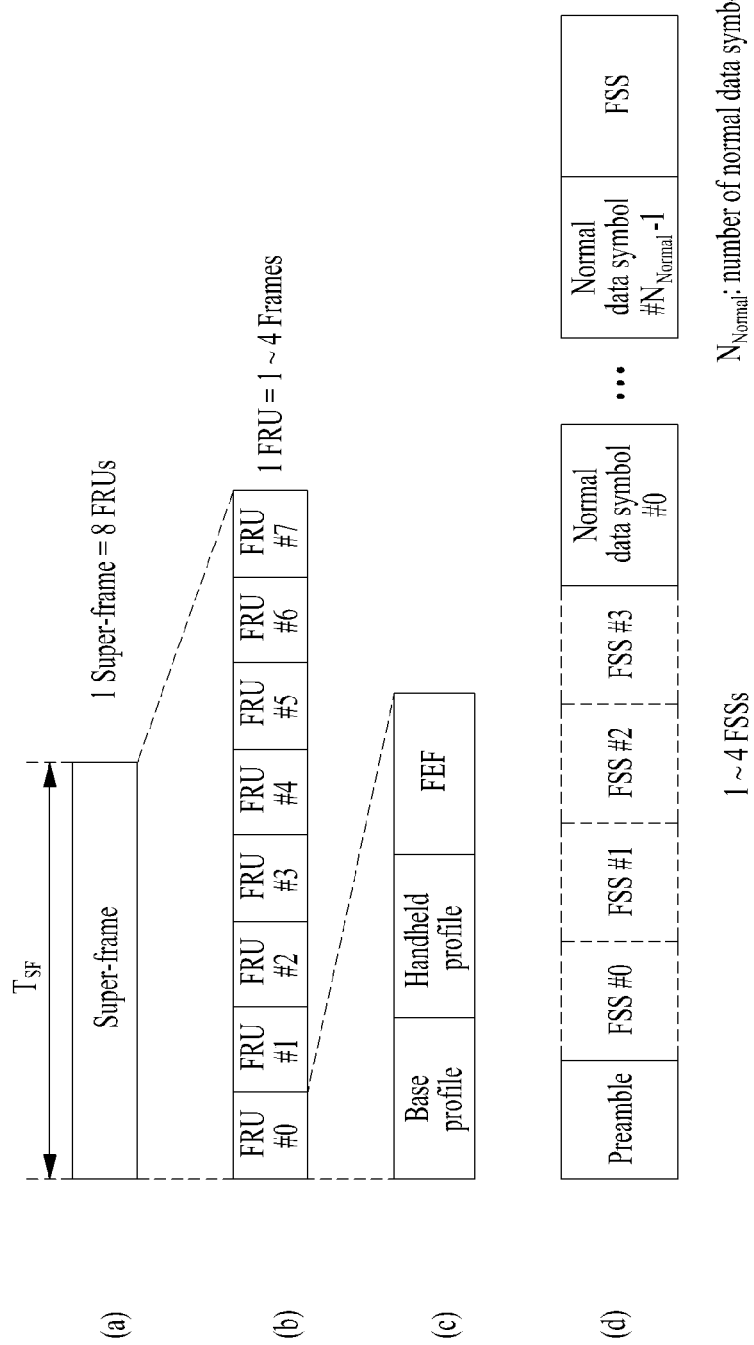

[Fig. 11]
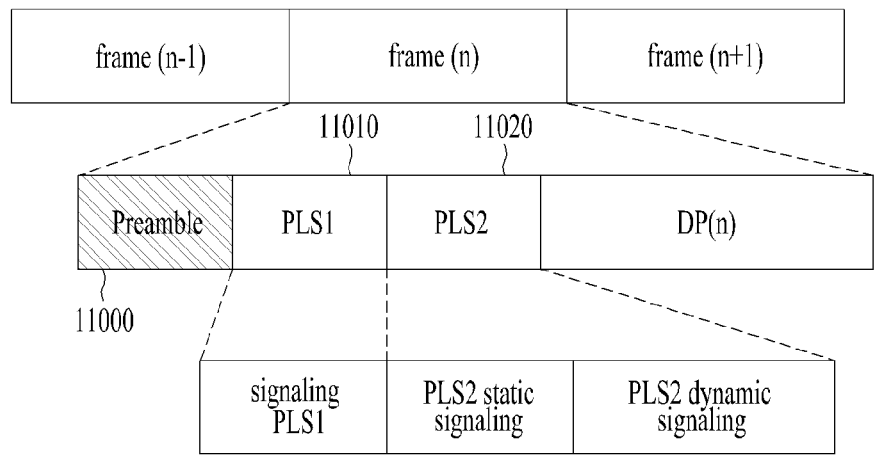
[Fig. 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Fig. 15]
| Content | | | Bit |
|---|---|---|---|
| FRAME_INDEX | | | 5 |
| PLS_CHANGE_COUNTER | | | 4 |
| FIC_CHANGE_COUNTER | | | 4 |
| RESERVED | | | 16 |
| for i = 1: NUM_DP | | | |
| | | DP_ID | 6 |
| | | DP_START | 15 (or13) |
| | | DP_NUM_BLOCK | 10 |
| end | | RESERVED | 8 |
| EAC_FLAG | | | 1 |
| EAS_WAKE_UP_VERSION_NUM | | | 8 |
| if EAC_FLAG == 1 | | | |
| | | EAC_LENGTH_BYTE | 12 |
| else | | | |
| | | EAC_COUNTER | 12 |
| end | | | |
| for i=1:NUM_AUX | | | |
| | | AUX_PRIVATE_DYN | 48 |
| end | | | |
| CRC 32 | | | 32 |
[Fig. 16]

[Fig. 17]
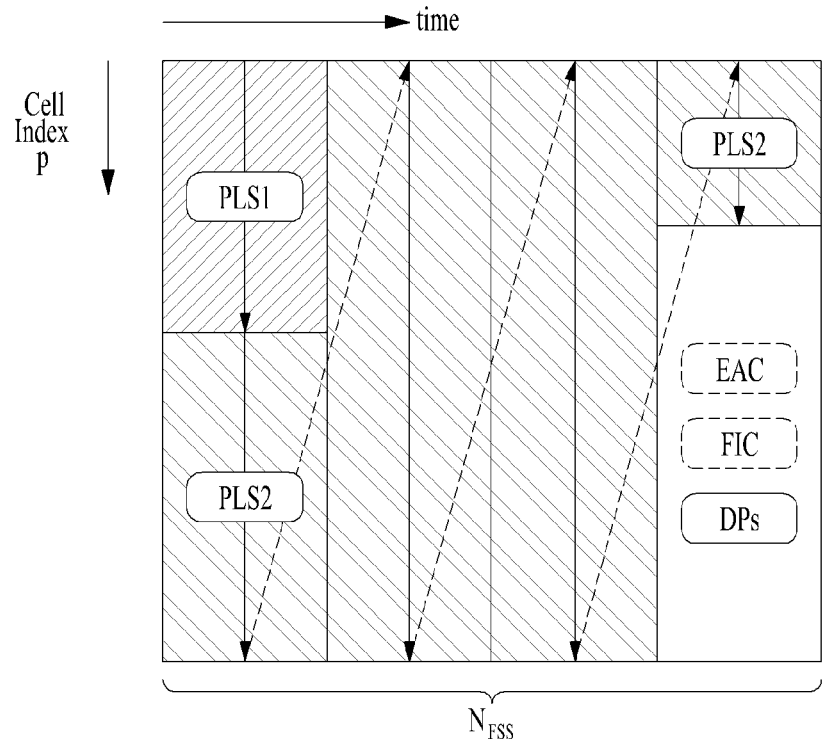
[Fig. 18]
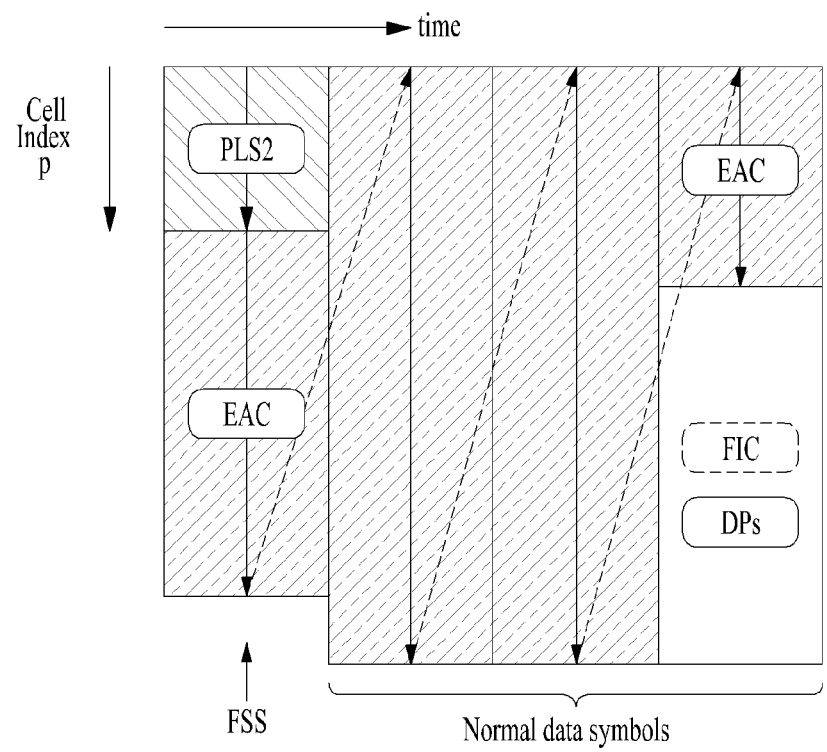

[Fig. 19]
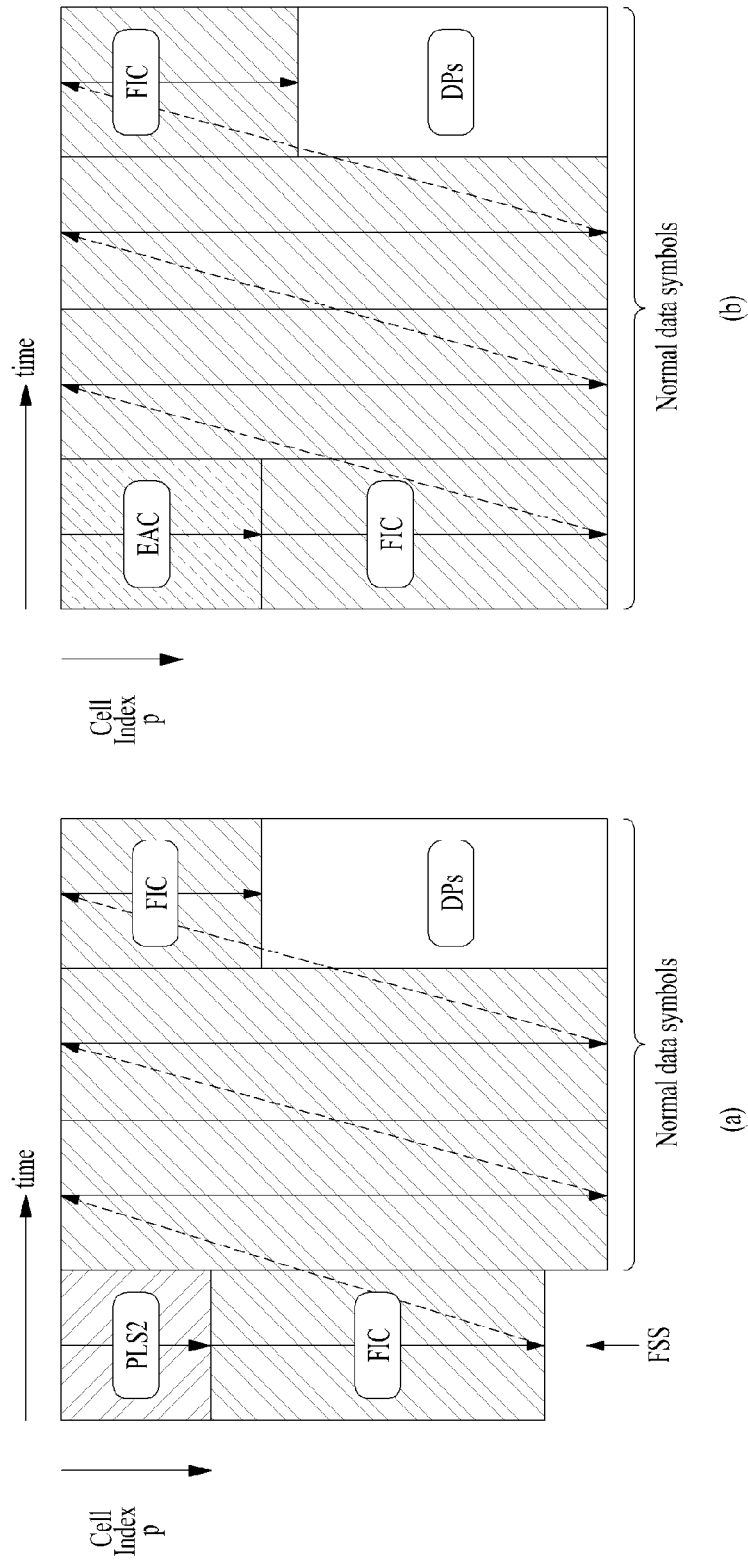

[Fig. 20]
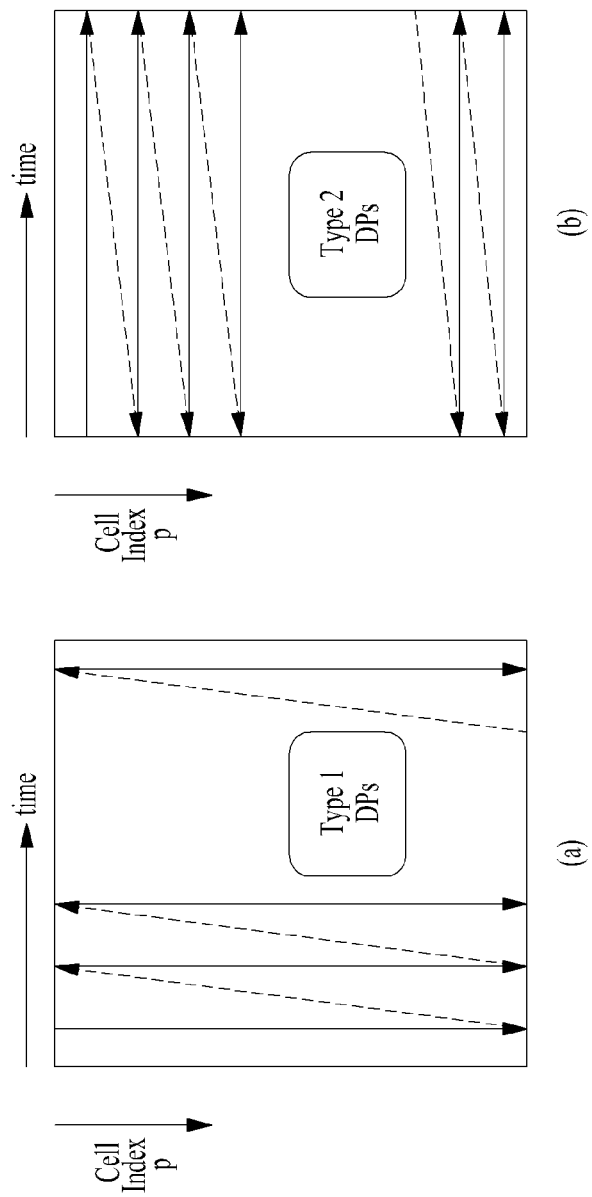

[Fig. 21]
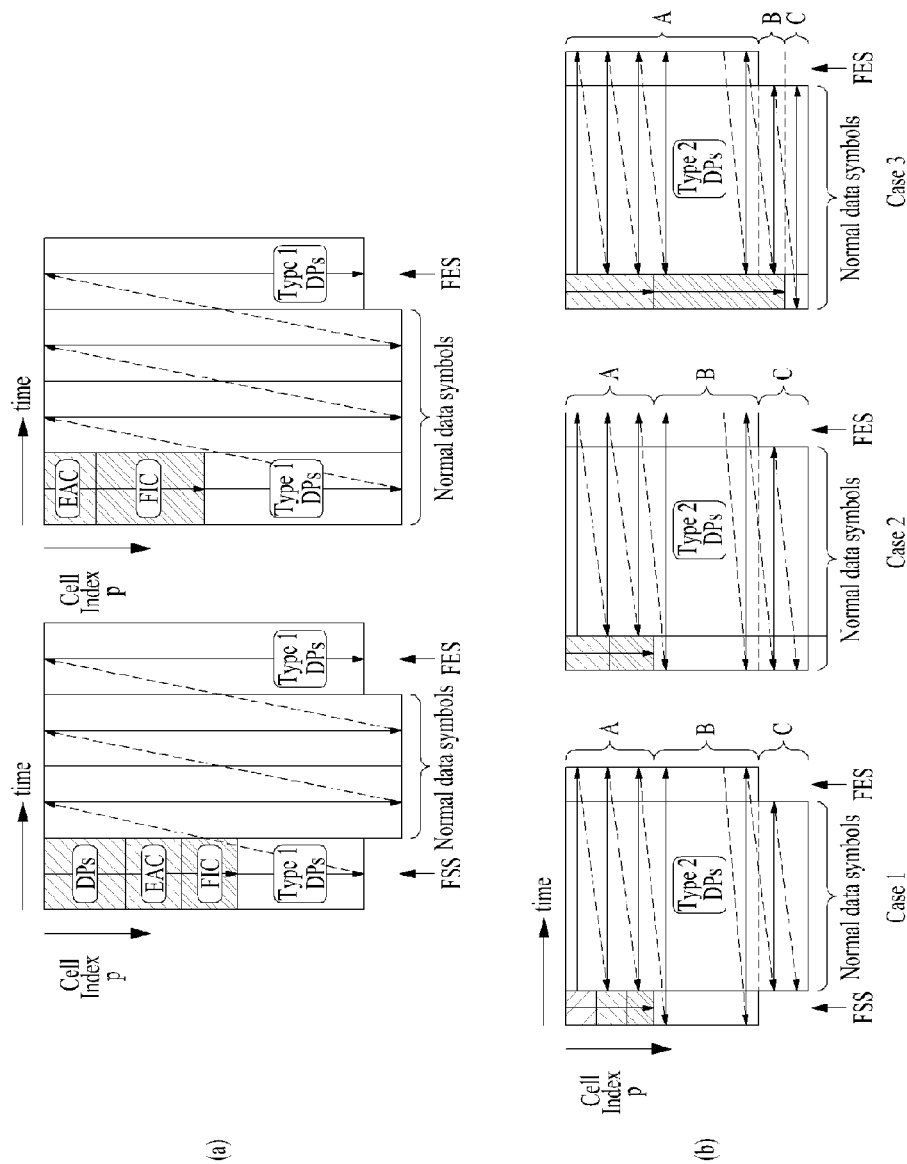
[Fig. 22]
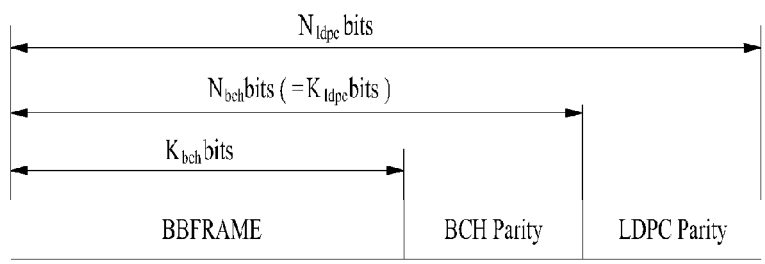

[Fig. 23]
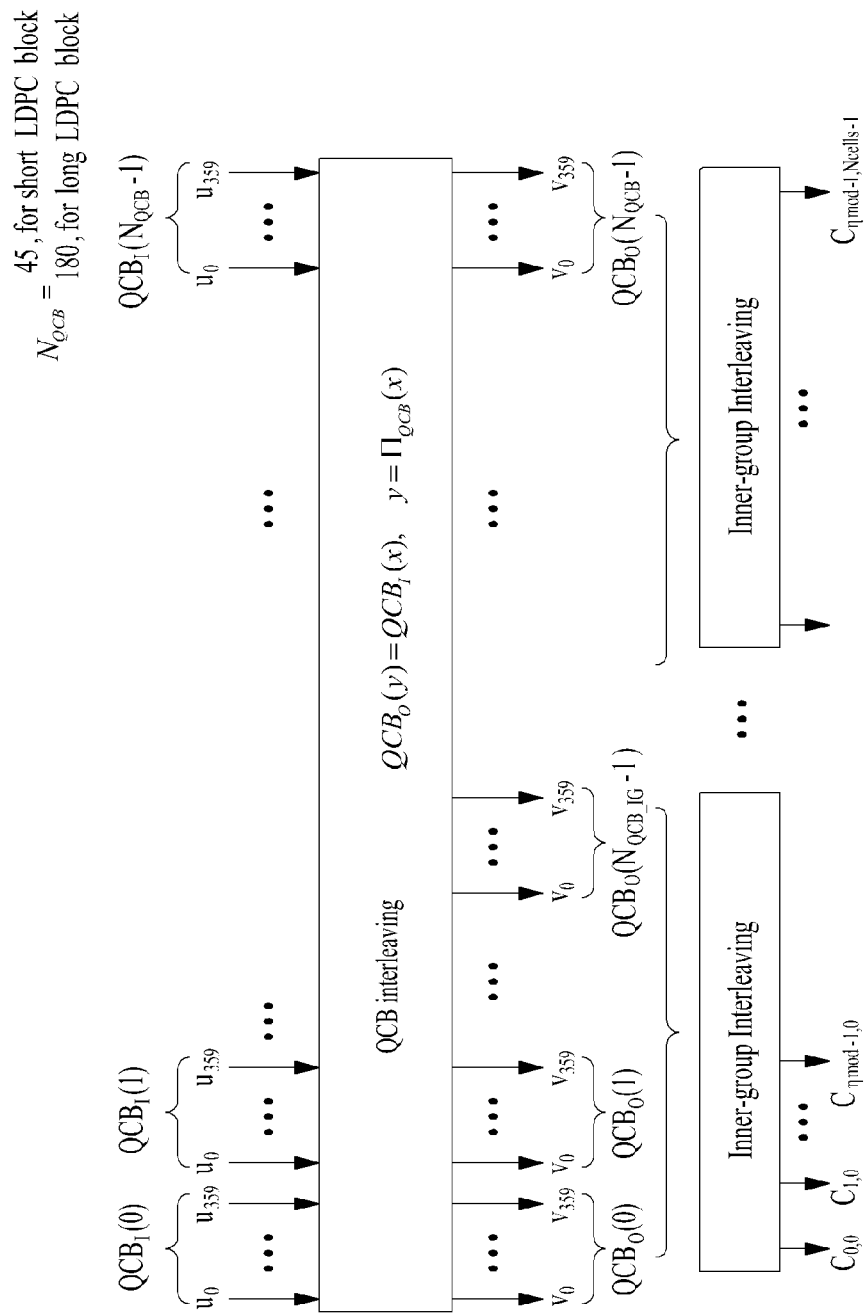

[Fig. 24]
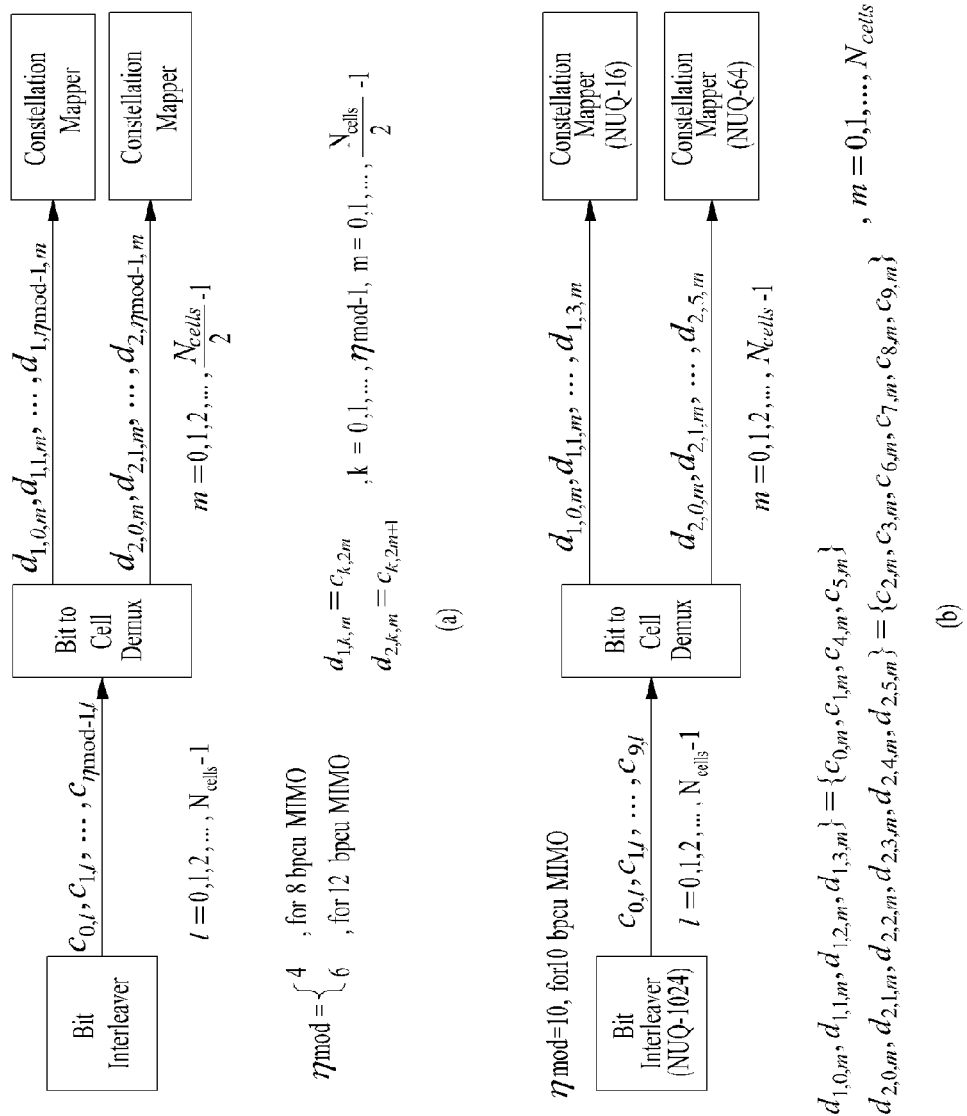

[Fig. 25]
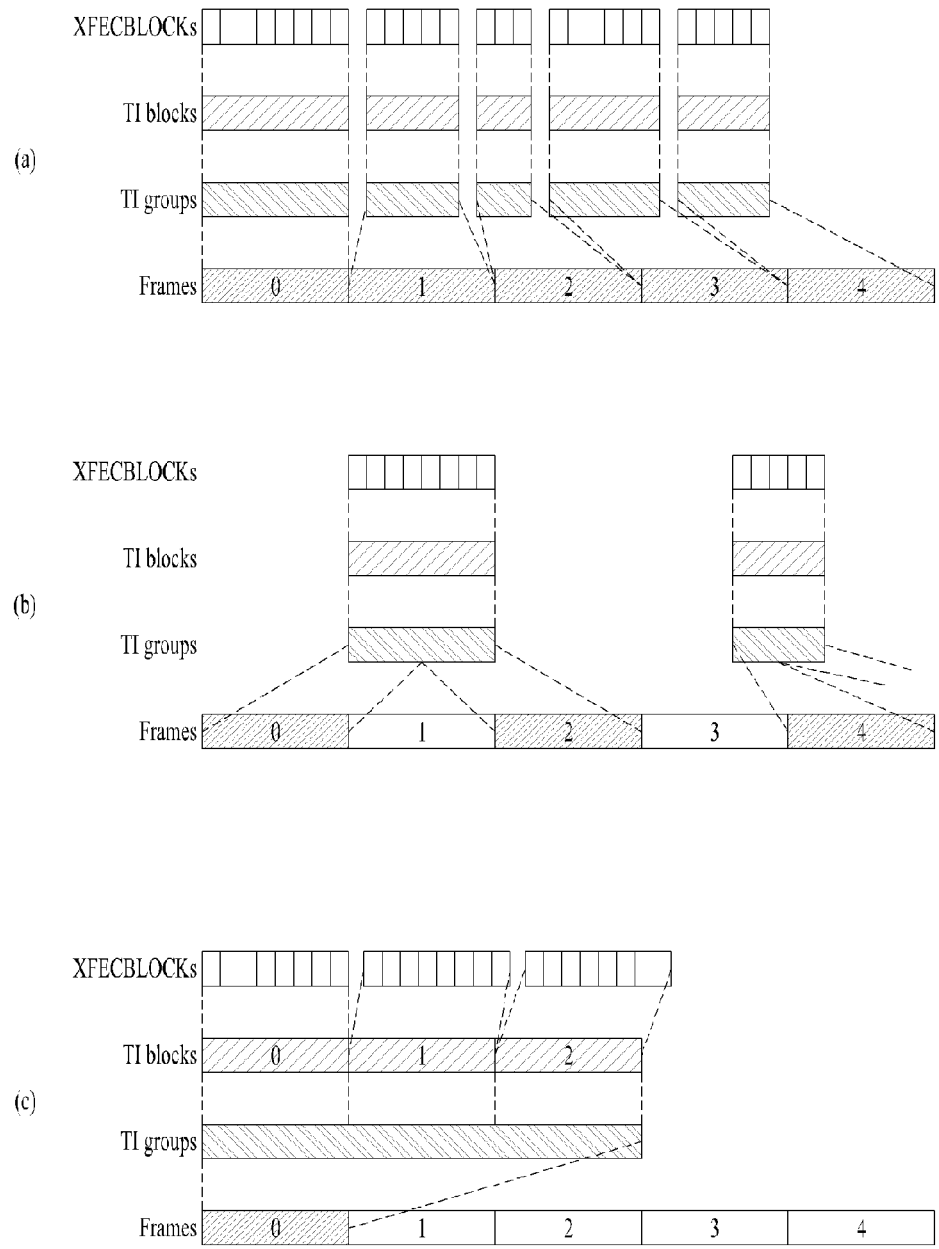

[Fig. 26]
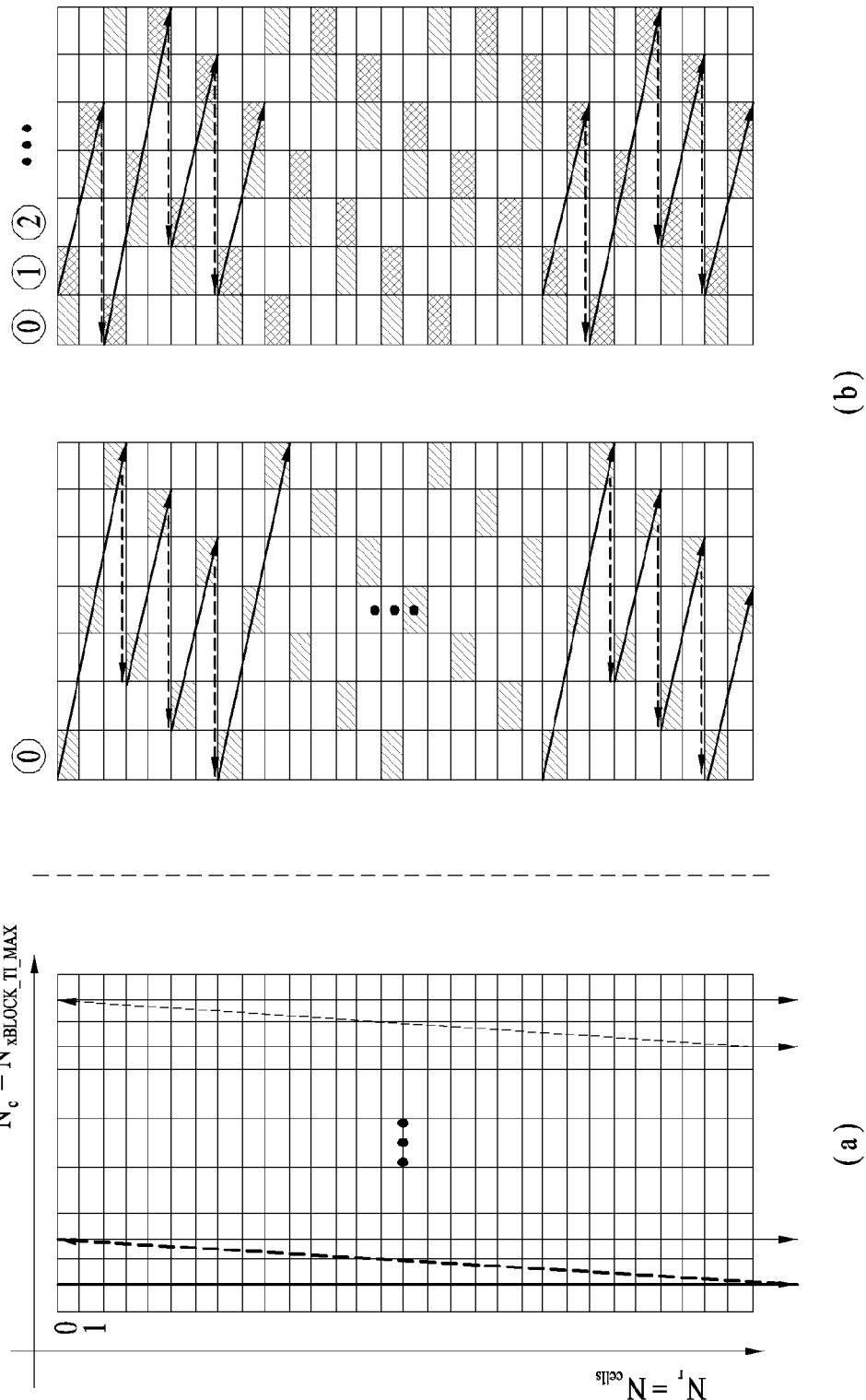

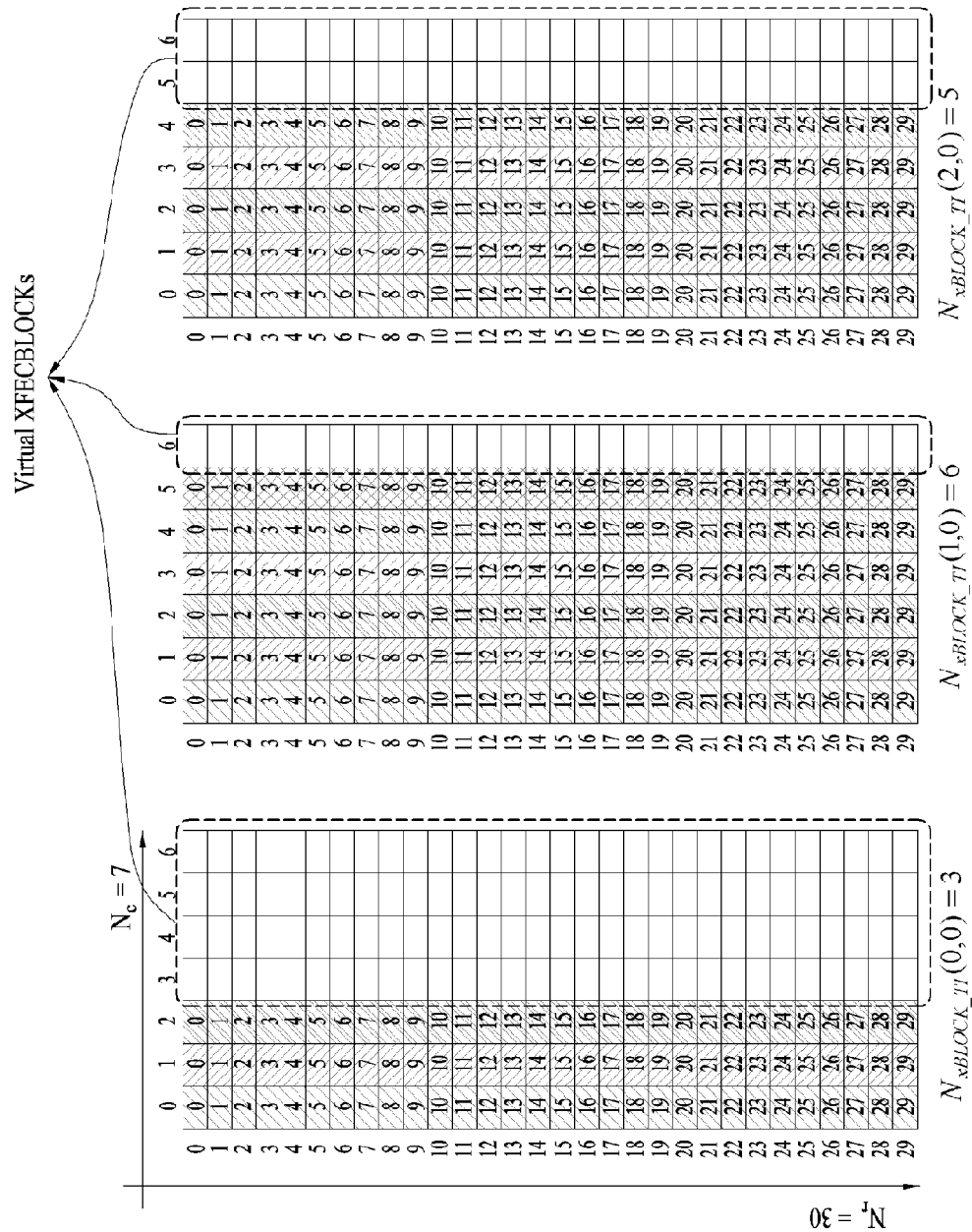
[Fig. 27]

[Fig. 28]
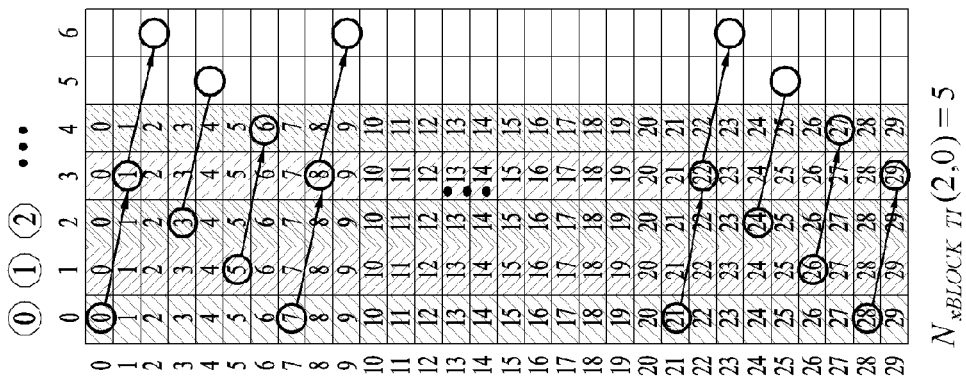
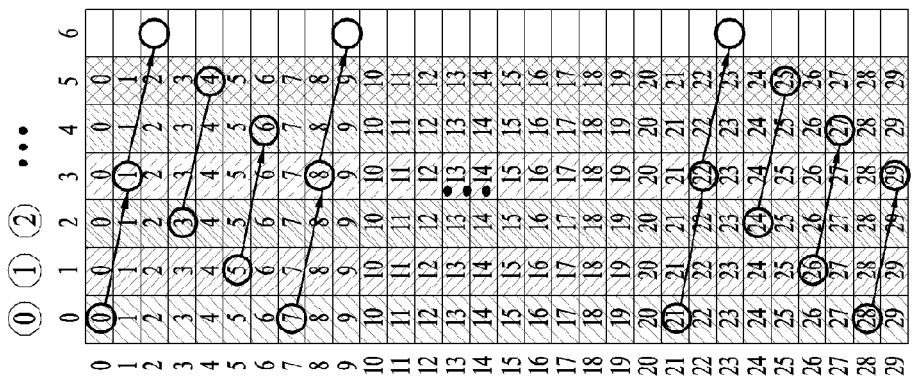
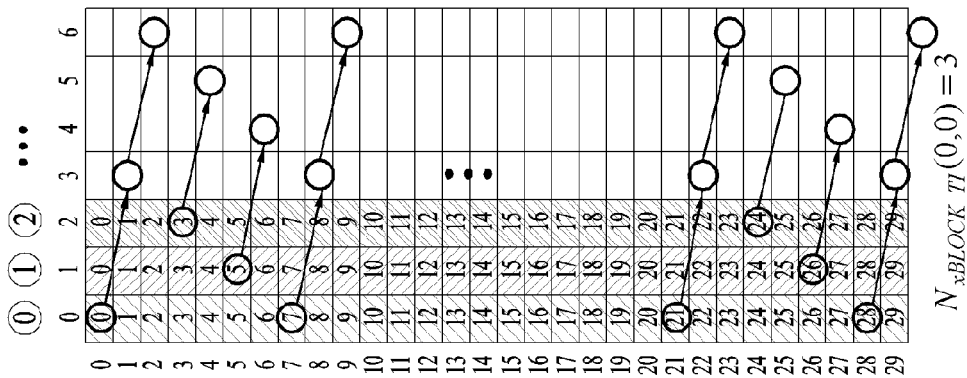

[Fig. 29]
[Fig. 30]
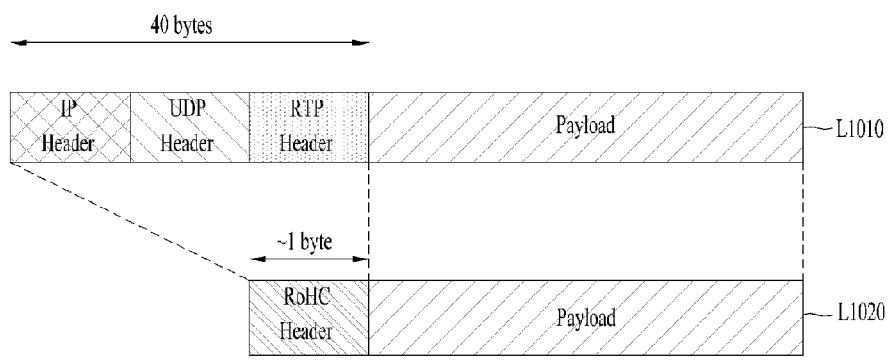

[Fig. 31]
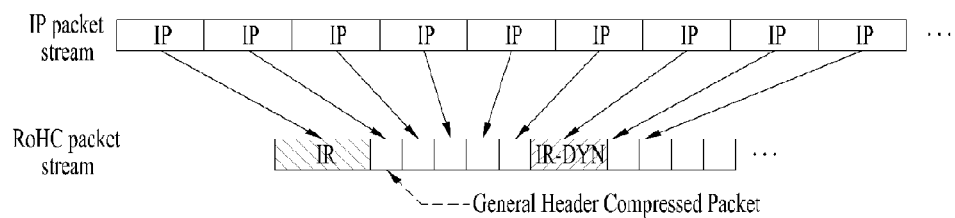
[Fig. 32]
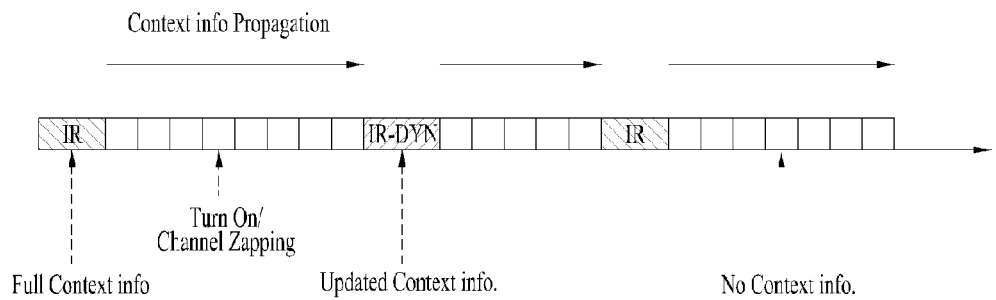

[Fig. 33]
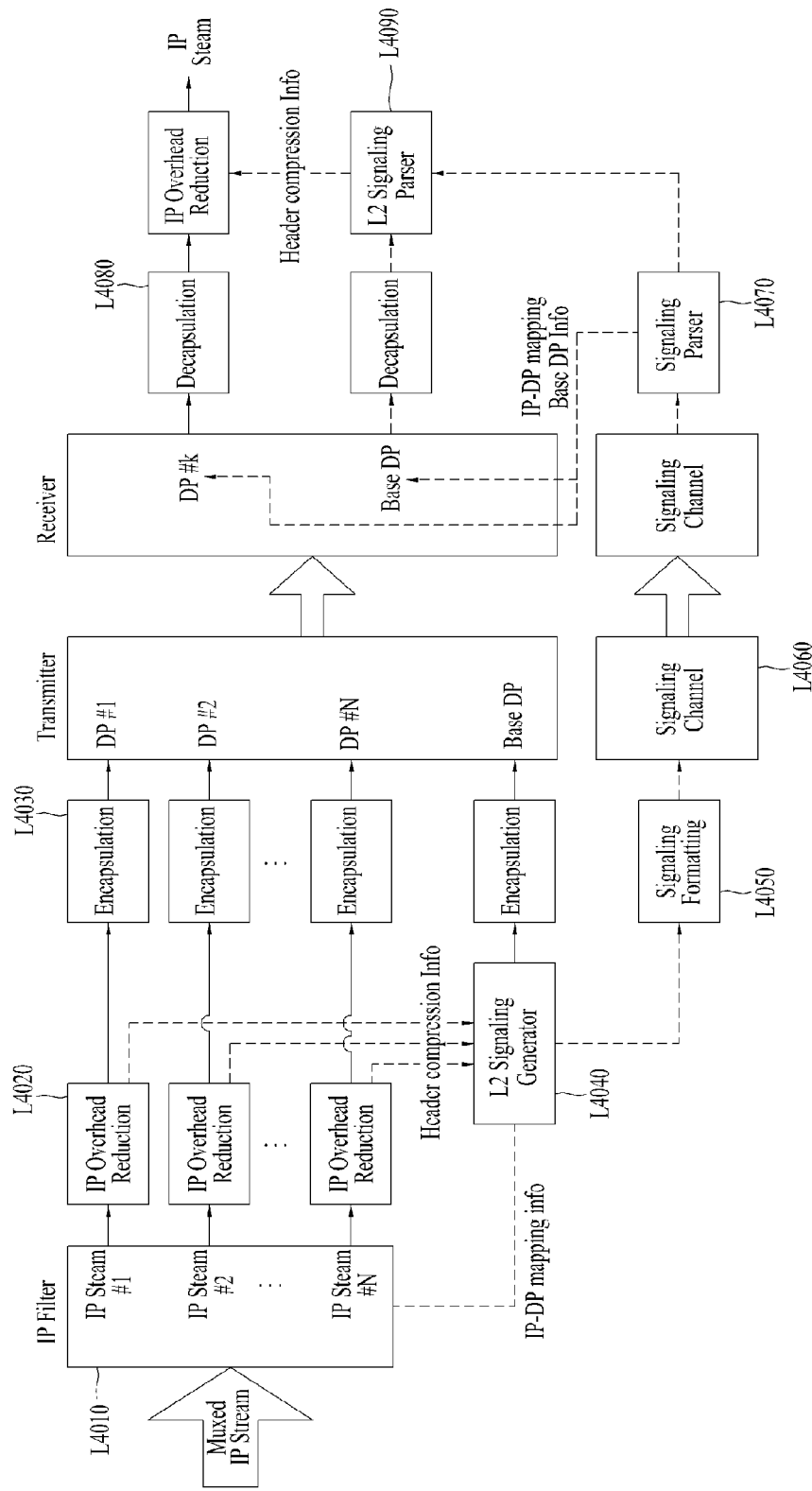

[Fig. 34]
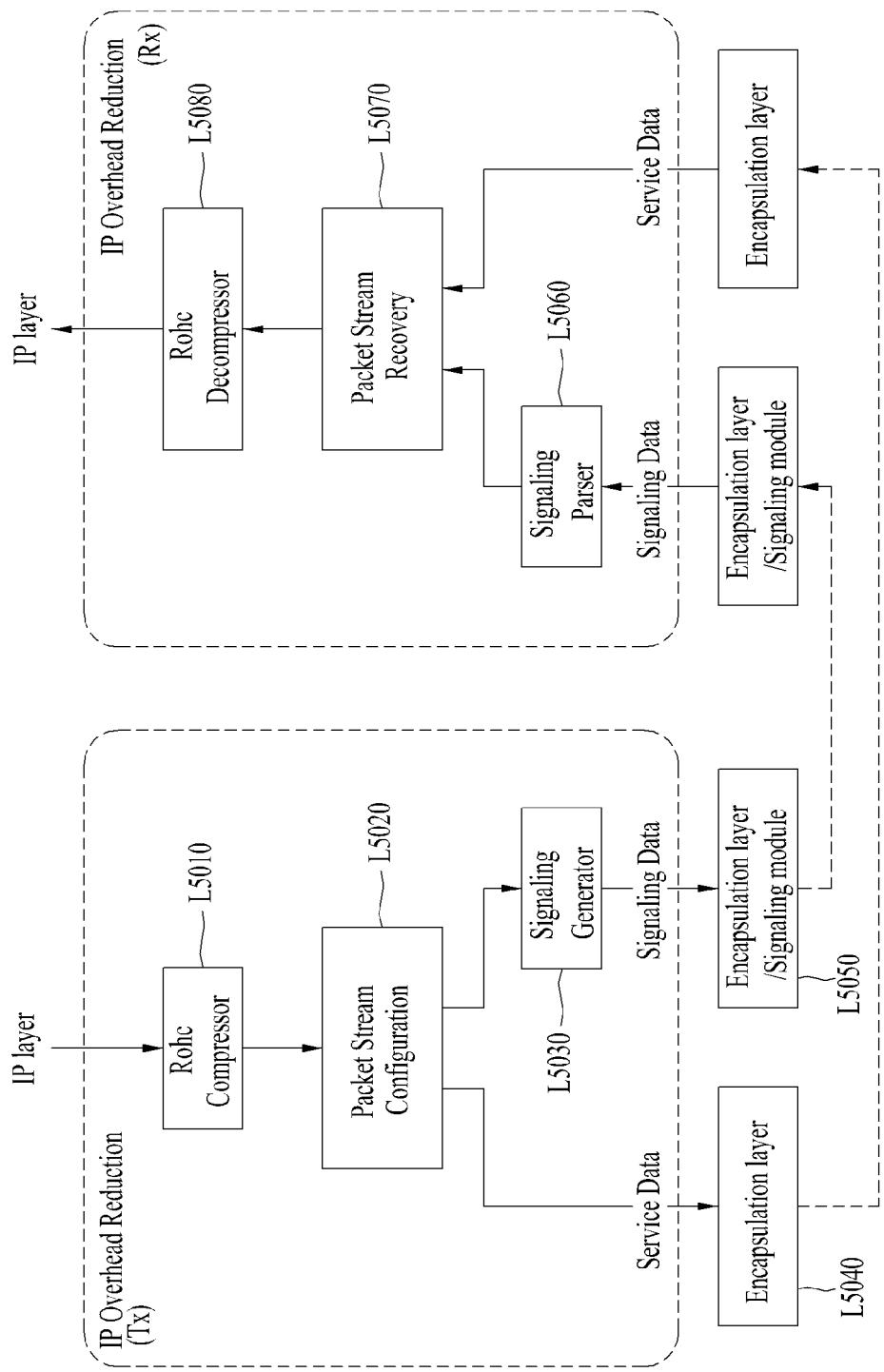

[Fig. 35]
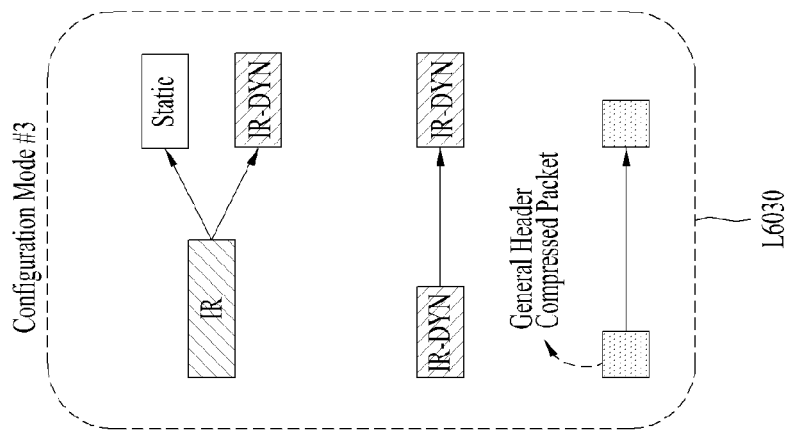
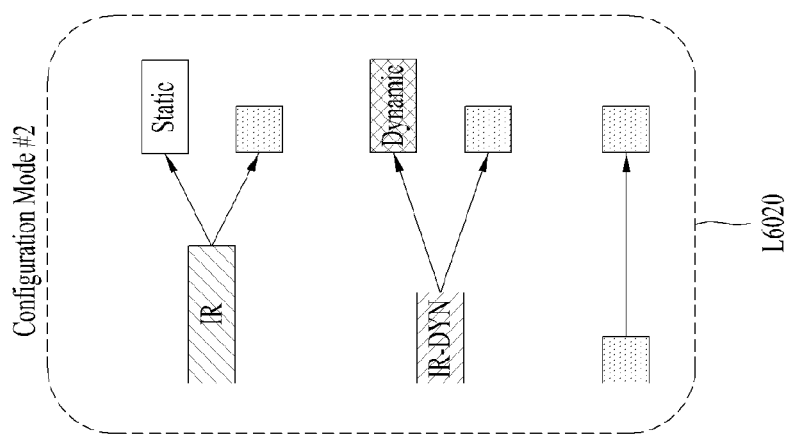
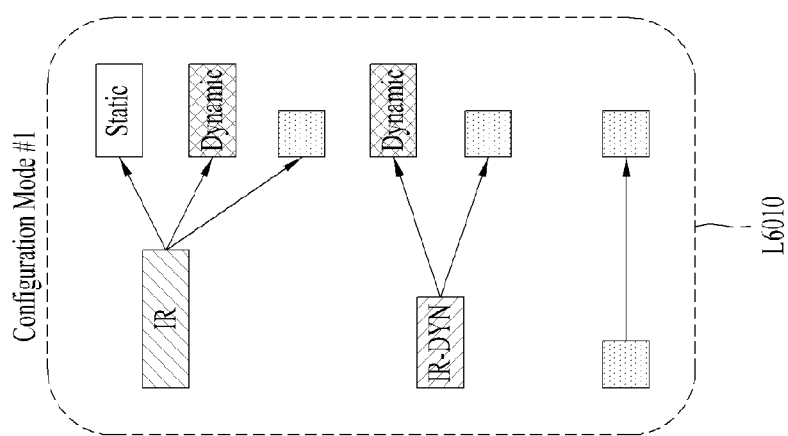

[Fig. 36]
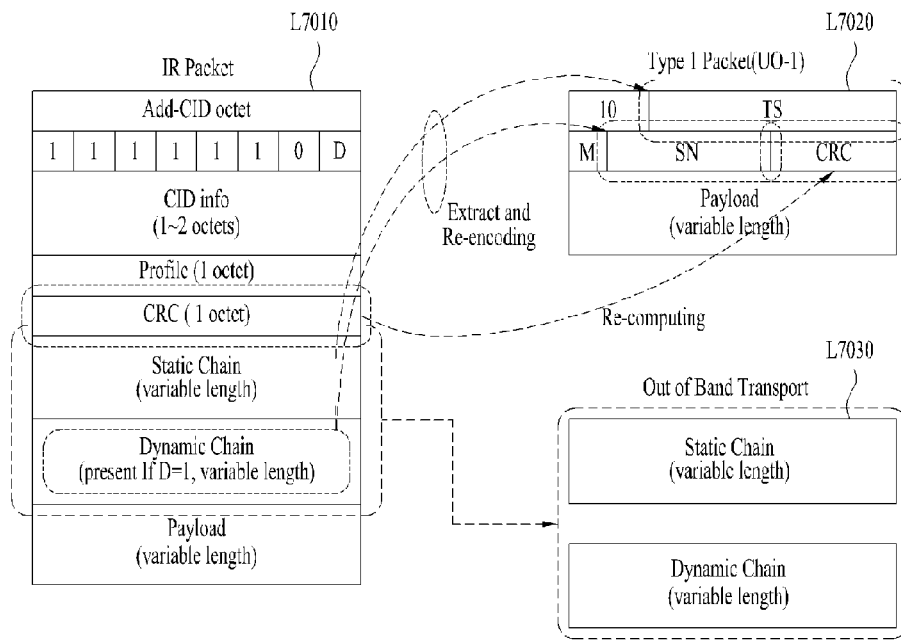
[Fig. 37]
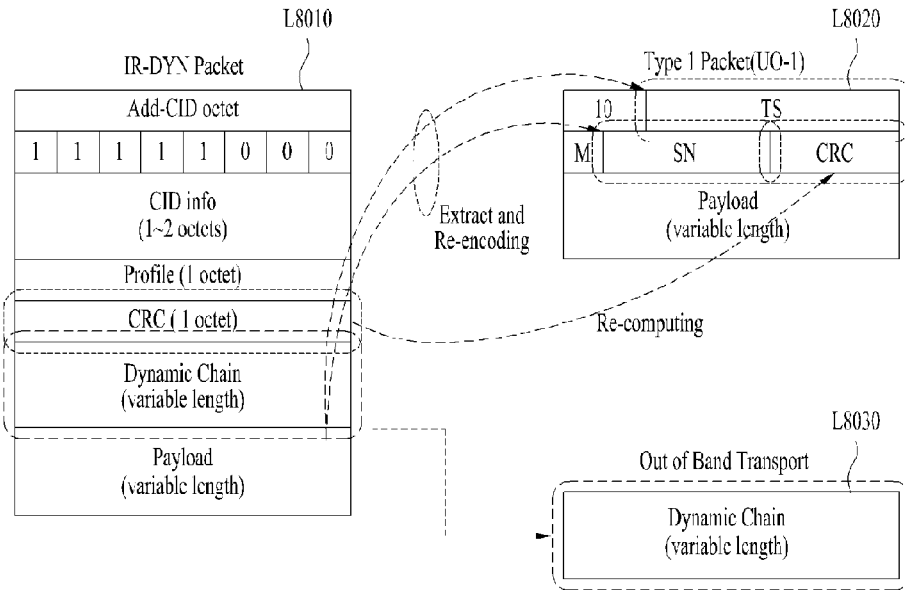

[Fig. 38]
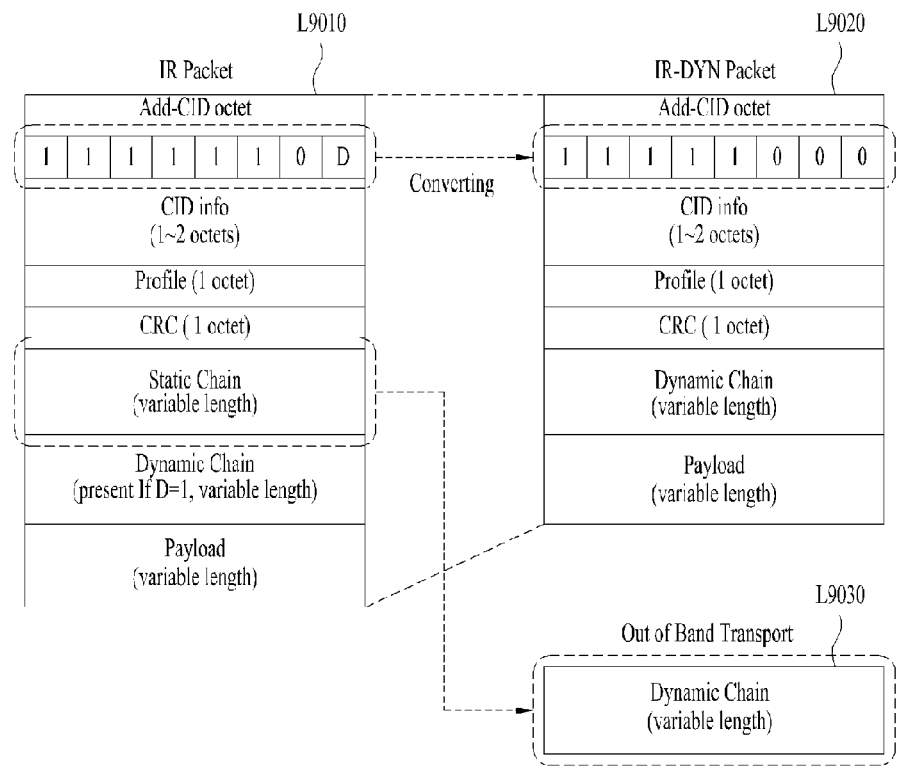

[Fig. 39]
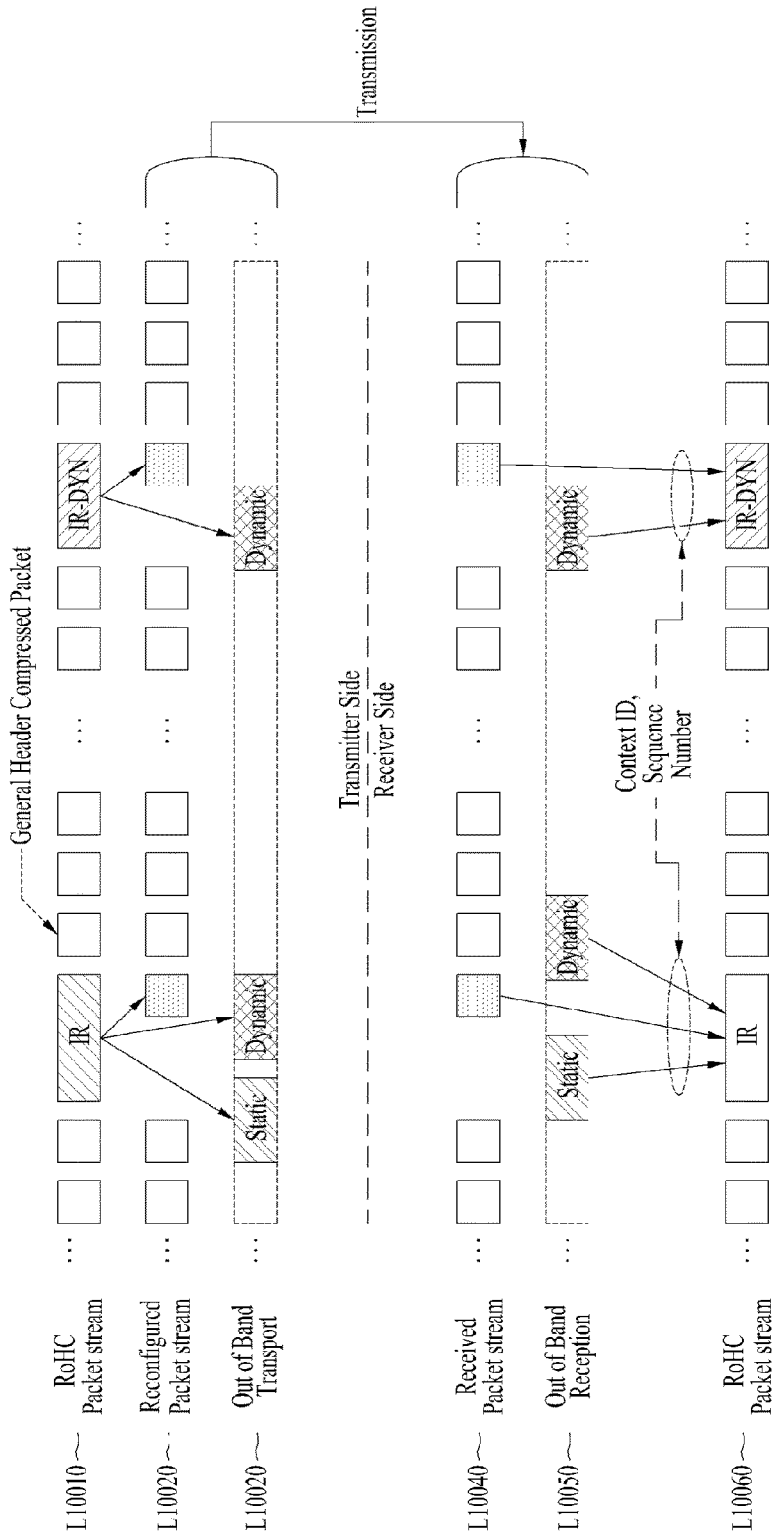

[Fig. 40]
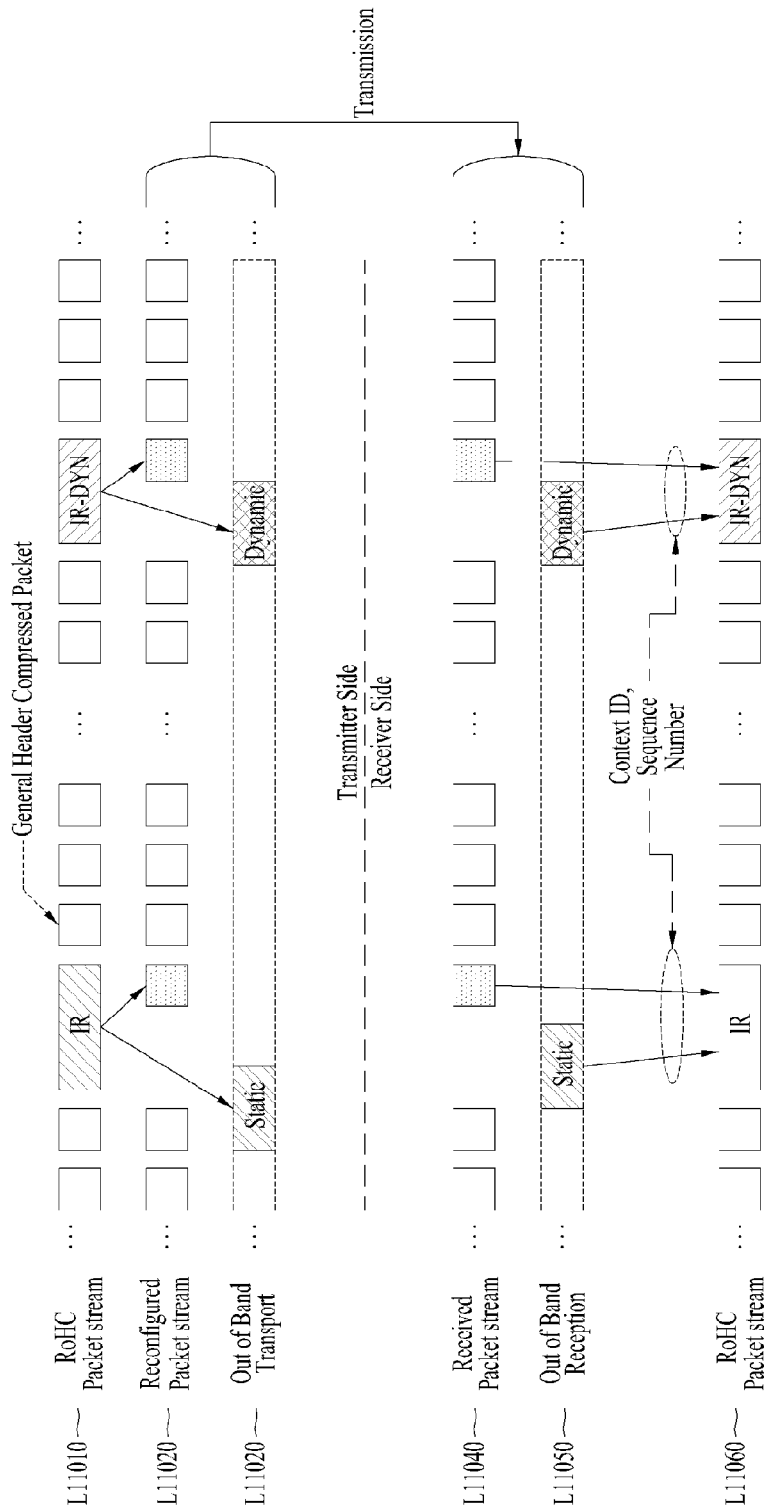

[Fig. 41]
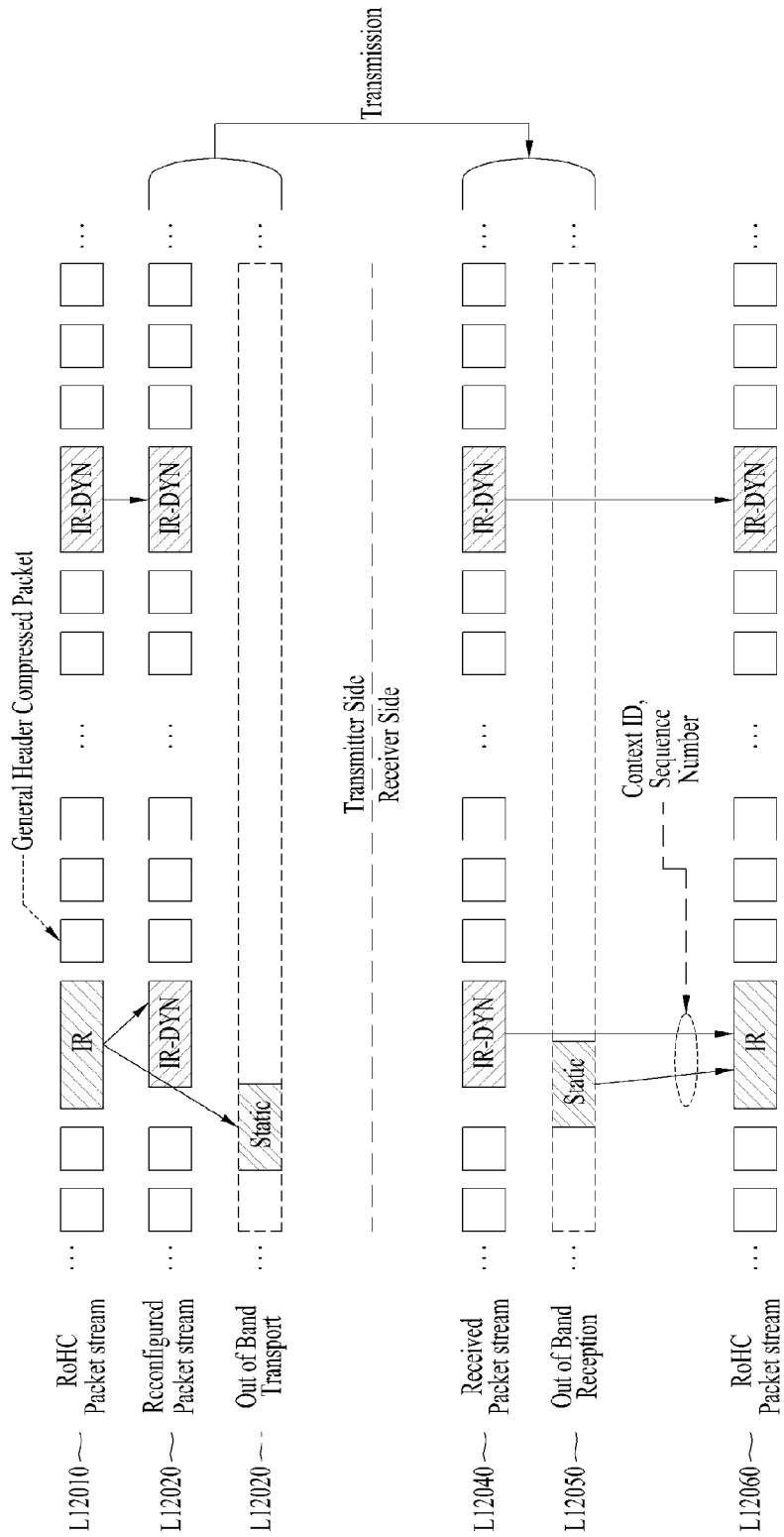

[Fig. 42]

| Transport Mode | Static Chain | Dynamic Chain | General Header Compressed Packet | Associated Configuration Mode |
|---|---|---|---|---|
| Mode 1 | Signaling | Signaling | Normal Data Pipe | Mode 1, Mode 2 |
| Mode 2 | Signaling | Base Data Pipe | | |
| Mode 3 | Base Data Pipe | Base Data Pipe | | |
| Mode 4 | Signaling | Normal Data Pipe (IR-DYN packet) | | Mode 3 |
| Mode 5 | Base Data Pipe | | | |

[Fig. 43]

| Syntax | No. of Bits | Format |
|---|---|---|
| ROHC_static_descriptor( ) { | | |
| descriptor_tag | 8 | uimsbf |
| descriptor_length | 8 | uimsbf |
| context_id | 8 or 16 | |
| context_profile | 8 | uimsbf |
| static_chain_length | 8 | uimsbf |
| static_chain ( ) | var | bslbf |
| } | | |

[Fig. 44]

| Syntax | No. of Bits | Format |
|---|---|---|
| ROHC_dynamic_descriptor( ) { | | |
| descriptor_tag | 8 | uimsbf |
| descriptor_length | 8 | uimsbf |
| context_id | 8 or 16 | |
| context_profile | 8 | uimsbf |
| dynamic_chain_length | 8 | uimsbf |
| dynamic_chain ( ) | var | bslbf |
| } | | |

[Fig. 45]

[Fig. 46]
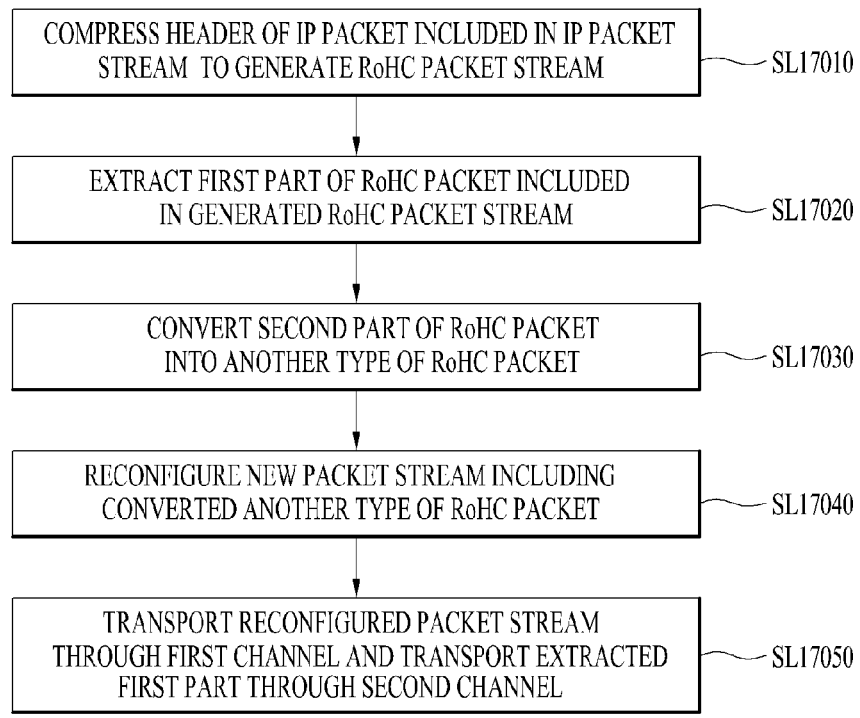
[Fig. 47]
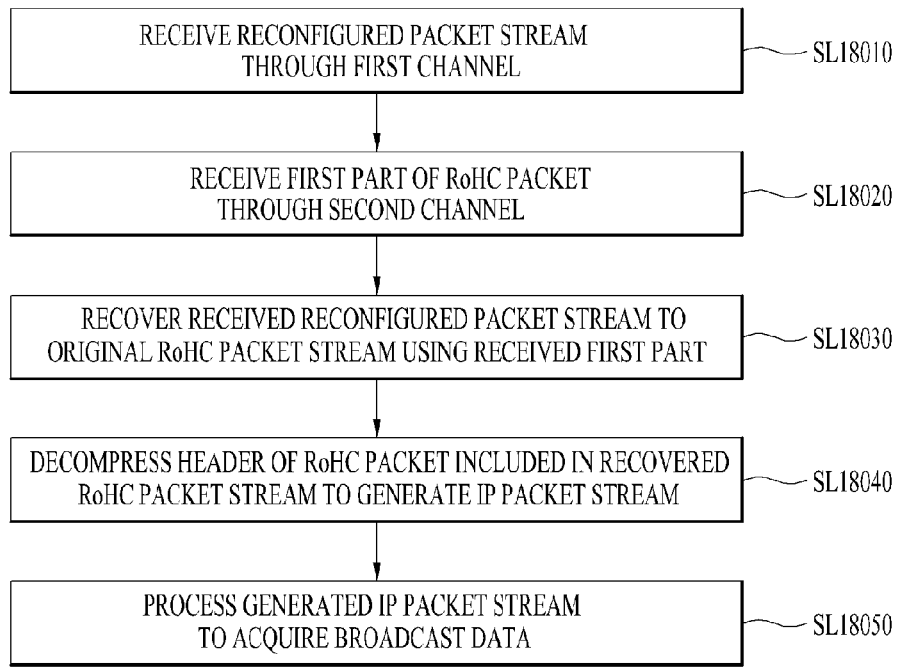

[Fig. 48]
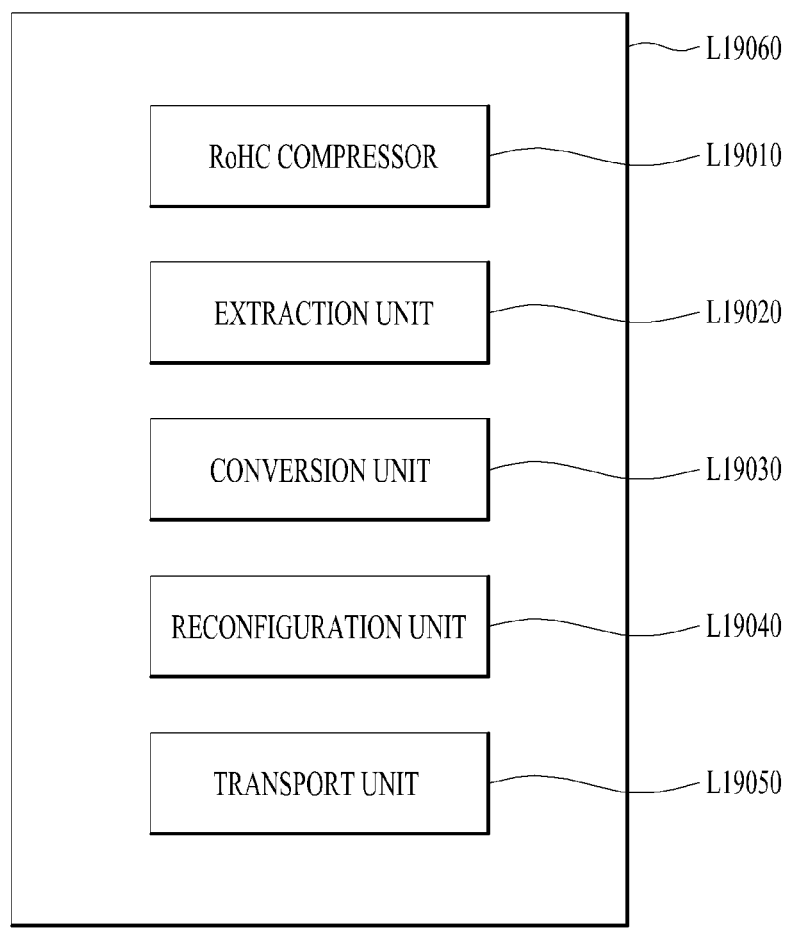

[Fig. 49]
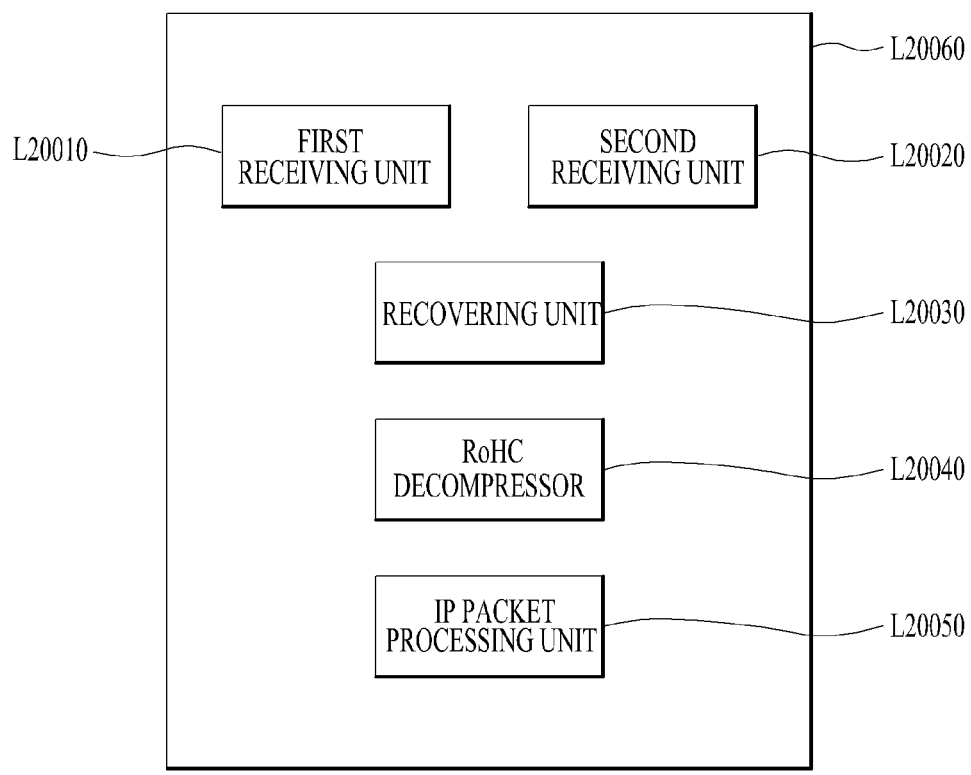

METHOD AND APPARATUS FOR TRANSMITTING/RECEIVING BROADCAST SIGNAL INCLUDING ROBUST HEADER COMPRESSION PACKET STREAM

CROSS REFERENCE TO RELATED APPLICATIONS

This application is the National Phase of PCT International Application No. PCT/KR2014/013107, filed on Dec. 31, 2014, which claims priority under 35 U.S.C. 119(e) to U.S. Provisional Application No. 61/923,246, filed on Jan. 3, 2014, all of which are hereby expressly incorporated by reference into the present application.

TECHNICAL FIELD

The present invention relates to transmission and reception of a broadcast signal and, more particularly, to a method and/or apparatus for transmitting and receiving a broadcast signal including a robust header compression (RoHC) packet stream.

BACKGROUND ART

IP/UDP/RTP header fields may be generally classified into static, delta, dynamic, and inferred attributes. Static is a field having a fixed value in one end to end packet stream. This field corresponds to an IP address and port number. In addition, this field also corresponds to a field, such as a RTP or IP version field, having a well-known value. Delta is a field having a fixed value difference from a previous packet. This field corresponds to sequence number. Dynamic is a randomly changeable field. This field corresponds to checksum and ID of an IP packet. Inferred corresponds to a field which may be inferred through another header field, such as a length field. A context identifier (CID) concept is introduced for a general header compression scheme. When a compressor sends a packet having an uncompressed full header while a specific CID is added thereto first and sends subsequent packets while omitting header fields having static, dynamic, or inferred properties as the same CID, a decompressor recovers all RTP headers by adding the omitted field to the compression header received after the second packet with reference to initially stored header field information based on the CID. For the delta header, the compressor and the decompressor store most fields of the full headers and, when the compressor transports only a difference value from a previous packet, the decompressor corrects the difference value using a previously stored value to perform recovery.

Robust Header Compression (RoHC) is a standardized scheme for compressing headers, such as IP, UDP, RTP, and TCP. In a streaming application, the IP, UDP, and RTP each have an overhead of 40 bytes for IPv4 and 60 bytes for IPv6. For VoIP, this value is equivalent to 60% all transported data. Such a great overhead may cause a serious problem in a wireless system having a limited bandwidth. Through RoHC, the overhead of 40 bytes or 60 bytes is compressed to 1 or 3 bytes, and decompression is performed after being delivered to the decompressor.

In RoHC, header fields are classified into static, dynamic, and inferable. A compression state in the compressor may be defined as Initialization and Refresh (IR), First Order (FO), and Second Order (SO) and a decompression state in the decompressor is defined as No Context (NC), Static Context (SC), and Full Context (FC). The RoHC scheme is to start transport at a low compression rate and to maintain a state in which transport is performed at the possible highest compression rate. When the decompressor fails to perform context initialization or decompression, a state of the compressor returns to IR, which is the lowest compression step, and in this state the compressor transports full headers. Subsequently, at the FO step, the compressor omits the static field. Finally, at the SO step, all compressible fields are not transported. A state of the decompressor may be changed from NC, which is the lowest step, to the SC and FC steps. At the FC step, an optimal decompression operation is performed.

RoHC performs compression in a scheme in which total headers are transported at the beginning of transport and unchanged portions are omitted in the middle of transport. In a case in which this scheme is adopted by a broadcasting system, a broadcast receiver may not know when to receive an IP stream and a receiver which does not know all header information may not recognize a corresponding IP packet.

DISCLOSURE OF INVENTION

Technical Problem

An object of the present invention devised to solve the problem lies on a method and/or apparatus for transmitting and receiving a broadcast signal including an RoHC packet stream.

Another object of the present invention devised to solve the problem lies on a method of recovering a packet irrespective of an access time of a receiver in a unidirectional transport system.

Another object of the present invention devised to solve the problem lies on a method of transporting RoHC-related metadata to a decompressor in advance in a unidirectional transport system.

Another object of the present invention devised to solve the problem lies on a method of transporting RoHC-related metadata through a separate channel in a unidirectional transport system.

A further object of the present invention devised to solve the problem lies on a method of extracting information to be transported through a separate channel from an RoHC packet stream.

Solution to Problem

The object of the present invention can be achieved by providing a broadcast signal transmitting method including compressing a header of an IP packet included in an IP packet stream to generate an RoHC packet stream, extracting a first part of an RoHC packet included in the generated RoHC packet stream, converting a second part of the RoHC packet into another type of an RoHC packet, reconfiguring a new packet stream including the converted another type of the RoHC packet, transporting the reconfigured packet stream through a first channel, and transporting the extracted first part through a second channel.

The RoHC packet may correspond to any one selected from among a first packet including first header information changed whenever the packet is changed during streaming and a payload, a second packet including second header information changed at predetermined intervals as the packet is changed, the first header information, and the payload, and a third packet including third header information unchanged although the packet is changed during streaming, the first header information, and the payload.

The third packet may further include the second header information, the extraction step may include extracting the second header information and the third header information from the third packet included in the generated RoHC packet stream and extracting the second header information from the second packet included in the generated RoHC packet stream, and the conversion step may include converting the remainder of the third packet excluding the extracted second header information and the extracted third header information into the first packet and converting the remainder of the second packet excluding the extracted second header information into the first packet.

The third packet may further include the second header information, the extraction step may include extracting the third header information from the third packet included in the generated RoHC packet stream, and the conversion step may include converting the remainder of the third packet excluding the extracted third header information into the second packet.

The extraction step may include extracting the third header information from the third packet included in the generated RoHC packet stream and extracting the second header information from the second packet included in the generated RoHC packet stream, and the conversion step may include converting the remainder of the third packet excluding the extracted third header information into the first packet and converting the remainder of the second packet excluding the extracted second header information into the first packet.

The second channel may include a signaling channel for transporting signaling information and a system channel for transporting information necessary for system decoding, and at least one selected from between the extracted second header information and the extracted third header information may be transported through the signaling channel or the system channel.

In a case in which the extracted second header information or the extracted third header information is transported through the signaling channel, the second header information or the third header information may be transported while being included in a sub element, and the sub element may include context identifier information for identifying a corresponding RoHC packet stream based on the second header information or the third header information and context profile information indicating up to which protocol a header of an RoHC packet included in the corresponding RoHC packet stream based on the second header information or the third header information has been compressed.

In a case in which the extracted second header information or the extracted third header information is transported through the system channel, the second header information or the third header information may be transported while being included in a payload of a packet, and the packet may include packet type information indicating type information of the packet, indicator information indicating whether information included in the payload is the second header information or the third header information, and length information indicating a length of the payload.

In another aspect of the present invention, provided herein is a broadcast signal receiving method including receiving a reconfigured packet stream through a first channel, the reconfigured packet stream being a new packet stream obtained by extracting a first part of an RoHC packet included in an RoHC packet stream, converting a second part of the RoHC packet into another type of an RoHC packet, and reconfiguring a new packet stream including the converted another type of the RoHC packet, receiving the extracted first part through a second channel, recovering the received reconfigured packet stream to an original RoHC packet stream using the received first part, decompressing a header of the RoHC packet included in the recovered RoHC packet stream to generate an IP packet stream, and processing the generated IP packet stream to acquire broadcast data.

The RoHC packet may correspond to any one selected from among a first packet including first header information changed whenever the packet is changed during streaming and a payload, a second packet including second header information changed at predetermined intervals as the packet is changed, the first header information, and the payload, and a third packet including third header information unchanged although the packet is changed during streaming, the first header information, and the payload.

The third packet may further include the second header information, and the recovery step may include, in a case in which the second header information and the third header information received while being included in the first part have the same sequence number, detecting a first packet having the same sequence number as the received second header information and the received third header information and combining the received second header information and the received third header information with the detected first packet to recover a third packet, and in a case in which the received second header information and the received third header information have different sequence numbers, detecting a first packet having the same sequence number as the received second header information and combining the received second header information with the detected first packet to recover a second packet, thereby recovering the received reconfigured packet stream to the original RoHC packet stream.

The third packet may further include the second header information, and the recovery step may include detecting a second packet having the same sequence number as the third header information received while being included in the first part and combining the received second header information with the detected second packet to recover a third packet, thereby recovering the received reconfigured packet stream to the original RoHC packet stream.

The recovery step may include detecting a first packet having the same sequence number as the third header information received while being included in the first part and combining the received third header information with the detected first packet to recover a third packet and detecting a first packet having the same sequence number as the second header information received while being included in the first part and combining the received second header information with the detected first packet to recover a second packet, thereby recovering the received reconfigured packet stream to the original RoHC packet stream.

The second channel may include a signaling channel for transporting signaling information and a system channel for transporting information necessary for system decoding, and at least one selected from between the extracted second header information and the extracted third header information may be transported through the signaling channel or the system channel.

In a case in which the extracted second header information or the extracted third header information is transported through the signaling channel, the second header information or the third header information may be transported while being included in a sub element, and the sub element may include context identifier information for identifying a corresponding RoHC packet stream based on the second header information or the third header information and context profile information indicating up to which protocol a header of an RoHC packet included in the corresponding RoHC packet stream based on the second header information or the third header information has been compressed.

In a case in which the extracted second header information or the extracted third header information is transported through the system channel, the second header information or the third header information may be transported while being included in a payload of a packet, and the packet may include packet type information indicating type information of the packet, indicator information indicating whether information included in the payload is the second header information or the third header information, and length information indicating a length of the payload.

In another aspect of the present invention, provided herein is a broadcast signal transmitting apparatus including an RoHC compressor for compressing a header of an IP packet included in an IP packet stream to generate an RoHC packet stream, an extraction unit for extracting a first part of an RoHC packet included in the generated RoHC packet stream, a conversion unit for converting a second part of the RoHC packet into another type of an RoHC packet, a reconfiguration unit for reconfiguring a new packet stream including the converted another type of the RoHC packet, and a transport unit for transporting the reconfigured packet stream through a first channel and transporting the extracted first part through a second channel.

In a further aspect of the present invention, provided herein is a broadcast signal receiving apparatus including a first receiving unit for receiving a reconfigured packet stream through a first channel, the reconfigured packet stream being a new packet stream obtained by extracting a first part of an RoHC packet included in an RoHC packet stream, converting a second part of the RoHC packet into another type of an RoHC packet, and reconfiguring a new packet stream including the converted another type of the RoHC packet, a second receiving unit for receiving the extracted first part through a second channel, a recovering unit for recovering the received reconfigured packet stream to an original RoHC packet stream using the received first part, an RoHC decompressor for decompressing a header of the RoHC packet included in the recovered RoHC packet stream to generate an IP packet stream, and an IP packet processing unit for processing the generated IP packet stream to acquire broadcast data.

Advantageous Effects of Invention

According to the present invention, it is possible to transmit and receive a broadcast signal including an RoHC packet stream.

According to the present invention, it is possible to recover a transported packet irrespective of an access time of a receiver.

According to the present invention, it is possible for the receiver to receive RoHC-related metadata before reception of real data.

According to the present invention, it is possible to transport RoHC-related metadata through a channel different from a real data transport channel.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interlaved XFECBLOCKs from each interleaving array according to an embodiment of the present invention.

FIG. 30 is a view showing the structure of a Robust Header Compression (RoHC) packet and an uncompressed Internet Protocol (IP) packet according to an embodiment of the present invention.

FIG. 31 is a view showing a concept of an RoHC packet stream according to an embodiment of the present invention.

FIG. 32 is a view showing a context information propagation procedure during transport of an RoHC packet stream according to an embodiment of the present invention.

FIG. 33 is a view showing a transmitting and receiving system of an IP stream, to which an IP header compression scheme according to an embodiment of the present invention is applied.

FIG. 34 is a view showing an IP overhead reduction procedure in a transmitter/receiver according to an embodiment of the present invention.

FIG. 35 is a view showing a procedure of reconfiguring an RoHC packet to configure a new packet stream according to an embodiment of the present invention.

FIG. 36 is a view showing a procedure of converting an IR packet into a general header compressed packet in a procedure of reconfiguring an RoHC packet to configure a new packet stream according to an embodiment of the present invention.

FIG. 37 is a view showing a procedure of converting an IR-DYN packet into a general header compressed packet in a procedure of reconfiguring an RoHC packet to configure a new packet stream according to an embodiment of the present invention.

FIG. 38 is a view showing a procedure of converting an IR packet into an IR-DYN packet in a procedure of reconfiguring an RoHC packet to configure a new packet stream according to an embodiment of the present invention.

FIG. 39 is a view showing a configuration and recovery procedure of an RoHC packet stream in a first configuration mode (Configuration Mode #1) according to an embodiment of the present invention.

FIG. 40 is a view showing a configuration and recovery procedure of an RoHC packet stream in a second configuration mode (Configuration Mode #2) according to an embodiment of the present invention.

FIG. 41 is a view showing a configuration and recovery procedure of an RoHC packet stream in a third configuration mode (Configuration Mode #3) according to an embodiment of the present invention.

FIG. 42 is a view showing a combination of information that can be delivered through Out of Band according to an embodiment of the present invention.

FIG. 43 is a view showing configuration of a descriptor including a static chain according to an embodiment of the present invention.

FIG. 44 is a view showing configuration of a descriptor including a dynamic chain according to an embodiment of the present invention.

FIG. 45 is a view showing configuration of a packet format including a static chain and a packet format including a dynamic chain according to an embodiment of the present invention.

FIG. 46 is a view showing a broadcast signal transmitting method according to an embodiment of the present invention.

FIG. 47 is a view showing a broadcast signal receiving method according to an embodiment of the present invention.

FIG. 48 is a view showing the structure of a broadcast signal transmitting apparatus according to an embodiment of the present invention.

FIG. 49 is a view showing the structure of a broadcast signal receiving apparatus according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

In this specification, 'signaling' indicates transport/reception of service information (SI) provided by a broadcasting system, an Internet broadcasting system, and/or a broadcasting/Internet convergence system. The service information includes broadcasting service information (for example, ATSC-SI and/or DVB-SI) provided by existing broadcasting systems.

In this specification, a 'broadcast signal' is defined as a concept including a signal and/or data provided in bidirectional broadcasting, such as Internet broadcasting, broadband broadcasting, communication broadcasting, data broadcasting, and/or Video On Demand (VOD), in addition to terrestrial broadcasting, cable broadcasting, satellite broadcasting, and/or mobile broadcasting.

In this specification, 'PLP' means a fixed unit for transporting data belonging to a physical layer. Consequently, an element named 'PLP' may also be named a 'data unit' or a 'data pipe'.

One of the powerful applications utilized in a digital broadcasting (DTV) service may be a hybrid broadcasting service based on interlocking between a broadcasting network and an Internet network. In the hybrid broadcasting service, enhancement data associated with broadcast audio/video (A/V) content transported through a terrestrial broadcasting network or a portion of the broadcast A/V content is transported through the Internet network in real time such that users can experience various kinds of content.

It is an object of the present invention to propose a method of encapsulating an IP packet, an MPEG-2 TS packet, and a packet that can be used in other broadcasting system such that the packets can be delivered to a physical layer in a next generation digital broadcasting system. In addition, the present invention also proposes a method of transporting layer 2 signaling with the same header format.

The following procedures may be realized by an apparatus. For example, a signaling processing unit, a protocol processing unit, a processor, and/or a packet generation unit may perform the following procedures.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data.

The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_1$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

MathFigure 1

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math.1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/ reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal de-modulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all trans-missions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2 SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_1$, the number of the frames to which each TI group is mapped, and there is one TI-block per TI group ($N_{TI}$=1). The allowed $P_1$ values with 2-bit field are defined in the below table 18.

If the DP_TI_TYPE is set to the value '0', this field indicates the number of TI-blocks $N_{TI}$ per TI group, and there is one TI group per frame ($P_I$=1). The allowed $P_I$ values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{Jump}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame.

This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for

EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2 MOD and PLS2 FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction;

Type 1 DPs always precede Type 2 DPs. The total number of OFDM cells carrying Type 1 and Type 2 DPs cannot exceed the total number of OFDM cells available for transmission of DPs:

MathFigure 2

$$D_{DP1}+D_{DP2} \leq D_{DP} \quad \text{[Math.2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

MathFigure 3

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math.3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits,

MathFigure 4

$$p_0=p_1=p_2=\ldots=p_{N_{ldpc}-K_{ldpc}-1}=0$$ [Math.4]

2) Accumulate the first information bit $-i_0$, at parity bit addresses specified in the first row of an addresses of parity check matrix. The details of addresses of parity check matrix will be described later. For example, for rate 13/15:

MathFigure 5

$$p_{983} = p_{983} \oplus i_0$$
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$
$$p_{6974} = p_{6974} \oplus i_0$$
$$p_{7572} = p_{7572} \oplus i_0$$
$$p_{8260} = p_{8260} \oplus i_0$$
$$p_{8496} = p_{8496} \oplus i_0$$
[Math.5]

3) For the next 359 information bits, $i_s$, $s=1, 2, \ldots, 359$ accumulate $i_s$ at parity bit addresses using following Math figure.

MathFigure 6

$$\{x+(s \bmod 360) \times Q_{ldpc}\} \bmod(N_{ldpc}-K_{ldpc})$$ [Math.6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

MathFigure 7

$$p_{1007} = p_{1007} \oplus i_1$$
$$p_{2839} = p_{2839} \oplus i_1$$
$$p_{4861} = p_{4861} \oplus i_1$$
$$p_{5013} = p_{5013} \oplus i_1$$
$$p_{6162} = p_{6162} \oplus i_1$$
$$p_{6482} = p_{6482} \oplus i_1$$
$$p_{6945} = p_{6945} \oplus i_1$$
$$p_{6998} = p_{6998} \oplus i_1$$
$$p_{7596} = p_{7596} \oplus i_1$$
$$p_{8284} = p_{8284} \oplus i_1$$
$$p_{8520} = p_{8520} \oplus i_1$$
[Math.7]

4) For the 361st information bit $i_{360}$, the addresses of the parity bit accumulators are given in the second row of the addresses of parity check matrix. In a similar manner the addresses of the parity bit accumulators for the following 359 information bits $i_s$, $s=361, 362, \ldots, 719$ are obtained using the Math FIG. 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

MathFigure 8

$$p_i=p_i\oplus p_{i-1}, i=1,2,\ldots,N_{ldpc}-K_{ldpc}-1$$ [Math.8]

where final content of $p_i$, $i=0, 1, \ldots N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word ($c_{0,1}$, $c_{1,1}$, ..., $c_{nmod-1,1}$) of the bit interleaving output is demultiplexed into ($d_{1,0,m}$, $d_{1,1,m}$ ..., $d_{1,nmod-1,m}$) and ($d_{2,0,m}$, $d_{2,1,m}$ ..., $d_{2,nmod-1,m}$) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word ($c_{0,1}$, $c_{1,1}$, ..., $c_{9,1}$) of the Bit Interleaver output is demultiplexed into ($d_{1,0,m}$, $d_{1,1,m}$ ..., $d_{1,3,m}$) and ($d_{2,0,m}$, $d_{2,1,m}$ ..., $d_{2,5,m}$), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLock\_Group}(n)$ and is signaled as DP_NUM_BLOCK in the PLS2-DYN data. Note that $N_{xBLock\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1},$$
$$\ldots, d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q} & \text{, the output of } SSD\text{-encoding} \\ g_{n,s,r,q} & \text{, the output of } MIMO \text{ encoding} \end{cases}$$

In addition, assume that output XFECBLOCKs from the time interleaver are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, ..., $N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

MathFigure 9
GENERATE $(R_{n,s,i}, C_{n,s,i})$ = [Math. 9]

-continued
$$\begin{aligned}
\{ & \\
& R_{n,s,i} = \mod(i, N_r), \\
& T_{n,s,i} = \mod(S_{shift} \times R_{n,s,i}, N_c), \\
& C_{n,s,i} = \mod\left(T_{n,s,i} + \left\lfloor \frac{i}{N_r} \right\rfloor, N_c\right) \\
\}
\end{aligned}$$

where $S_{shift}$ is a common shift value for the diagonal-wise reading process regardless of $N_{xBLOCK\_TI}(n,s)$ , and it is determined by $N_{xBLOCK\_TI\_MAX}$ given in the PLS2-STAT as follows expression.

MathFigure 10

$$\text{for} \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases} \quad [\text{Math. 10}]$$

$$S_{shift} = \frac{N'_{xBLOCK\_TI\_MAX} - 1}{2}$$

As a result, the cell positions to be read are calculated by a coordinate as $$z_{n,s,i} = N_r C_{n,s,i} + R_{n,s,i}.$$

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$, The variable number $N_{xBLOCK\_TI}(n,s)=N_r$ will be less than or equal to $N'_{xBLOCK\_TI\_MAX}$ . Thus, in order to achieve a single-memory deinterleaving at the receiver side, regardless of $N_{xBLOCK\_TI}(n,s)$ , the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

MathFigure 11
[Math. 11]

$$p = 0;$$
$$\text{for } i = 0; i < N_{cells}N_{xBLOCK\_TI\_MAX}; i = i + 1$$
$$\{\text{GENERATE } (R_{n,s,i}, C_{n,s,i});$$
$$V_i = N_r C_{n,s,j} + R_{n,s,j}$$
$$\quad \text{if } V_i < N_{cells}N_{xBLOCK\_TI}\,(n,s)$$
$$\quad \{$$
$$\quad\quad Z_{n,s,p} = V_i; \; p = p + 1;$$
$$\quad \}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', $I_{JUMP}=1$, and $P_1=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $$\lfloor N_{xBLOCK\_Group\_MAX}/N_{TI}\rfloor = N_{xBLOCK\_TI\_MAX} = 6$$

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $$N'_{xBLOCK\ TI\ MAX}=7$$

and $S_{shift}=(7-1)/2=3$. Note that in the reading process shown as pseudocode above, if $$V_i \geq N_{cells}N_{xBLOCK\ TI}(n,s)$$

, the value of $V_i$ is skipped and the next calculated value of $V_i$ is used.

FIG. 29 illustrates interlaved XFECBLOCKs from each interleaving array according to an embodiment of the present invention.

FIG. 29 illustrates the interleaved XFECBLOCKs from each interleaving array with parameters of $$N'_{xBLOCK\_TI\_MAX}=7$$

and $S_{shift}=3$.

FIG. 30 is a view showing the structure of a Robust Header Compression (RoHC) packet and an uncompressed Internet Protocol (IP) packet according to an embodiment of the present invention.

An IP packet L1010 according to an embodiment of the present invention may include an IP Header, a User Datagram Protocol Header (UDP header), a Real time Transport Protocol Header (RTP Header), and/or a Payload.

An IP Header, a UDP Header, and an RTP Header according to an embodiment of the present invention may have a total length of about 40 bytes.

An RoHC Packet L1020 according to an embodiment of the present invention may include an RoHC Header and/or a Payload.

An RoHC Header according to an embodiment of the present invention is one obtained by compressing the headers of the IP packet. The RoHC Header may have a length of about 1 byte.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport.

According to an embodiment of the present invention, IP version, IP source address, IP destination address, IP fragment flag, UDP source port, UDP destination port, etc. may be almost unchanged at the time of IP streaming. Almost unchanged fields during streaming like the above-described fields may be named static fields. RoHC according to an embodiment of the present invention may not further transport such static fields for a while after transporting the static fields once. An embodiment of the present invention may name a state in which the static fields are not further transported for a while after transporting the static fields once an Initialization Refresh (IR) state and name a packet transporting the static fields an IR packet. In addition, according to an embodiment of the present invention, fields which are changed at any time but are maintained for a predetermined time may be named dynamic fields. An embodiment of the present invention may further transport the above-described dynamic fields. According to an embodiment of the present invention, a packet transporting the dynamic fields may be named an IR-DYN packet. According to an embodiment of the present invention, the IR packet and the IR-DYN packet may have a similar size to a conventional header since the IR packet and the IR-DYN packet contain all information of the conventional header.

According to an embodiment of the present invention, a method of compressing a header portion of the IP packet to reduce overhead of transported Internet Protocol (IP) packet data may be used. According to an embodiment of the present invention, an RoHC scheme, which is one of the IP packet header compression schemes, may be used and the RoHC scheme may secure reliability in a wireless section. The RoHC scheme may be used in a broadcasting system, such as Digital Video Broadcasting-Next Generation Handheld (DVB-NGH) and a mobile communication system, such as Long Term Evolution (LTE). The RoHC scheme may be used for a UDP and/or RTP packet although the RoHC scheme is a scheme for compressing and transporting the header of the IP packet.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport. In a case in which the above-described RoHC scheme is applied to a broadcasting system, a broadcast receiver may not know when to receive an IP stream and a general receiver which does not know all header information may not recognize a corresponding IP packet. An embodiment of the present invention may solve the above-described problem using signaling used in the broadcasting system.

An embodiment of the present invention may provide an IP header compression method for supporting sufficient transport of an IP packet in a next generation digital broadcasting system.

According to another embodiment of the present invention, the RoHC scheme may be applied to a packet of a FLUTE-based protocol. In order to apply the RoHC scheme to a FLUTE/ALC/LCT packet according to an embodiment of the present invention, a packet header may be classified into static fields, dynamic fields, and inferable fields. In the FLUTE/ALC/LCT packet according to an embodiment of the present invention, the static fields may include LCT Version Number (V), Congestion Control flag (C), Transport Session Identifier flag (S), Half-word flag (H), Congestion Control Information (CCI), Transport Session Identification (TSI), and/or Expected Residual Transmission time (ERT). LCT Version Number (V) may be a 4-bit field indicating version number of an LCT protocol. This field may be fixed to 1. Congestion Control flag (C) may be a 2-bit field indicating the size of Congestion Control. This field may have a size of 32, 64, 96, or 128 bits according to a value. Transport Session Identifier flag (S) may be a 1-bit field, which may be a variable indicating the size of TSI. This field may have a size of 32*S+16*H. Half-word flag (H) may be a 1-bit field, which may be a common variable indicating the size of TSI and TOI. Congestion Control Information (CCI) may have a size of 32, 64, 96, or 128 bits. This field may be a value used for a receiver to Congestion Control a packet in a transported session. This field may include the number of layers, the number of logical channels, and sequence numbers. This field may be used to refer to throughput of an available bandwidth in a path between a transmitter and the receiver. Transport Session Identification (TSI) may have a size of 16, 32, or 48 bits. This field may indicate an identifier identifying a session from a specific transmitter. Expected Residual Transmission time (ERT) is a 0 or 32-bit field indicating a time during which reception is effective. In the FLUTE/ALC/LCT packet according to an embodiment of the present invention, the dynamic fields may include Transport Object Identifier flag (O), Close Session flag (A), Close Object flag (B), LCT header length (HDR_LEN), CodePoint (CP), Sender Current Time (SCT), and/or Source Block Number (SBN). Transport Object Identifier flag (O) may be a 2-bit field, which may be a variable indicating the size of TOI. This field may have a size of 32*O+16*H. Close Session flag (A) may be a 1-bit field. This field may be generally set to 0. This field may be set to 1 when transport of a session packet is completed. Close Object flag (B) may be a 1-bit field. This field may be generally set to 0. This field may be set to 1 when transport of a data (Object) packet is completed. LCT header length (HDR_LEN) may be an 8-bit field. This field may express a header of LCT as 32 bits. CodePoint (CP) may be an 8-bit field indicating data type. Sender Current Time (SCT) may be a 0 or 32-bit field indicating a time during which the transmitter transports data to the receiver. Source Block Number (SBN) may be a 32-bit field. This field may identify a Source block of an Encoding Symbol in a generated Payload. In the FLUTE/ALC/LCT packet according to an embodiment of the present invention, the inferable fields may include Transport Object Identification (TOI), FEC Payload ID, Encoding Symbol ID (ESI), and/or Encoding Symbol(s). Transport Object Identification (TOI) may be a field having 16, 32, 48, 64, 80, 96, or 112 bits indicating an identifier identifying data (Object) from the receiver. The length and format of FEC Payload ID may be set by FEC Encoding ID. This field may be included in an FEC building block. Encoding Symbol ID (ESI) may be a 32-bit field identifying a special Encoding Symbol generated from a Source Block in a Payload. Encoding Symbol(s) may be divided data from which the receiver reforms data and have a variable size based on a divided size.

FIG. 31 is a view showing a concept of an RoHC packet stream according to an embodiment of the present invention.

As shown in this figure, static fields transported while being included in an IR packet and dynamic fields transported while being included in an IR-DYN packet may be transported only when needed. Other packets may be transported in the form of a header compressed packet including only about 1 to 2 bytes information.

According to an embodiment of the present invention, it is possible to reduce a header of 30 bytes or more per packet through the above-described concept of the RoHC packet stream. The header compressed packet may be classified into type 0, type 1, and type 2 according to the form of a compressed header. Use of an RoHC packet according to an embodiment of the present invention may conform to a conventional standard document.

FIG. 32 is a view showing a context information propagation procedure during transport of an RoHC packet stream according to an embodiment of the present invention.

As shown in this figure, full context info may be included in an IR packet and updated context info may be included in an IR-DYN packet. In addition, a header compressed packet excluding the IR packet and the IR-DYN packet may not include context info.

According to an embodiment of the present invention, a receiver having no IR information may not decode an RoHC stream until receiving the next IR packet to configure full context for unidirectional transport having no feedback channel. That is, in this figure, in a case in which the receiver receives an RoHC stream from a part denoted by Turn On, the receiver may not decode the RoHC stream until receiving the next IR packet. An embodiment of the present invention may transport IR information through a separate signaling channel so as to solve the above-described problem.

According to an embodiment of the present invention, RoHC configuration information, initial parameter, and/or IR packet information (full context information) may be needed so as to normally decode a transported RoHC packet.

According to an embodiment of the present invention, a header compressed packet compressed using an IP header compression method may be in-band transported and an IR packet including a static chain containing unchanged header information and a dynamic chain for context update may be out-of-band transported so as to reduce overhead of IP transport and to achieve efficient transport. At this time, packets received by the receiver may be recovered in order before transport.

FIG. 33 is a view showing a transmitting and receiving system of an IP stream, to which an IP header compression scheme according to an embodiment of the present invention is applied.

According to an embodiment of the present invention, IP streams may be configured to enter different Data Pipes (DPs). At this time, Header Compression Info may be transported to a receiver through an L2 signaling transport procedure and Header Compression Info may be used to recover the IP stream, to which the IP header compression scheme is applied, received by the receiver to an original IP stream. Header Compression Info may be encapsulated and transported to a DP. At this time, Header Compression Info may be transported to a normal DP or a DP for signaling transport (Base DP) according to the structure of a physical layer. In addition, Header Compression Info may be transported through a separate signaling channel in a case in which it is supported by the physical layer.

According to an embodiment of the present invention, IP-DP mapping info may be transported to the receiver through the L2 signaling transport procedure and IP-DP mapping info may be used to recover the IP stream from the DP received by the receiver. IP-DP mapping info may be encapsulated and transported to a DP. At this time, IP-DP mapping info may be transported to a normal DP or a DP for signaling transport (Base DP) according to the structure of a physical layer. In addition, IP-DP mapping info may be transported through a separate signaling channel in a case in which it is supported by the physical layer.

As shown in this figure, an IP Stream muxed by a compressor may be divided into one or more IP streams by an IP Filter L4010. Each IP stream may be compressed by an IP header compression scheme L4020 and may be transported to each DP through an encapsulation procedure L4030. At this time, an L2 Signaling Generator L4040 may generate signaling information including Header Compression Info and/or IP-DP mapping info. The generated signaling information may be encapsulated and transported to a decompressor through a Base DP or may pass through a Signaling Formatting procedure L4050 and transported to the decompressor through a signaling channel L4060.

As shown in this figure, the DPs received by the decompressor may be recovered into respective IP streams by IP-DP mapping info parsed by a Signaling Parser L4070. The IP streams, having passed through a Decapsulation procedure L4080, may be recovered into the IP stream before the IP header compression scheme is applied by Header Compression Info parsed by an L2 Signaling Parser L4090.

FIG. 34 is a view showing an IP overhead reduction procedure in a transmitter/receiver according to an embodiment of the present invention.

According to an embodiment of the present invention, when an IP stream enters an overhead reduction procedure, an RoHC Compressor L5010 may perform header compression for the corresponding stream. An embodiment of the present invention may use an RoHC method as a header compression algorithm. In a Packet Stream Configuration procedure L5020, a packet stream having passed through an RoHC procedure may be reconfigured according to the form of an RoHC packet. The reconfigured RoHC packet stream may be delivered to an encapsulation layer L5040 and then transported to the receiver through a physical layer. RoHC context information and/or signaling information generated in a procedure of reconfiguring the packet stream may be made into a transportable form through a signaling generator L5030 and delivered to a encapsulation layer or a signaling module L5050 according to the form of transport.

According to an embodiment of the present invention, the receiver may receive a stream for service data and signaling data delivered through a signaling channel or a separate DP. A Signaling Parser L5060 may receive signaling data to parse RoHC context information and/or signaling information and deliver the parsed information to a Packet Stream Recovery procedure L5070. In the Packet Stream Recovery procedure L5070, the receiver may recover the packet stream reconfigured by the compressor into a form in which an RoHC decompressor L5080 can decompress the packet stream using RoHC context information and/or signaling information included in the signaling data. The RoHC Decompressor L5080 may convert the recovered RoHC packet stream into an IP stream. The converted IP stream may be delivered to an upper layer through an IP layer.

FIG. 35 is a view showing a procedure of reconfiguring an RoHC packet to configure a new packet stream according to an embodiment of the present invention.

The present invention may include three configuration modes.

According to a first configuration mode (Configuration Mode #1) L6010, which is an embodiment of the present invention, the first configuration mode may extract a static chain and a dynamic chain from an IR packet and convert the remainder of the corresponding packet into a general header compressed packet. The first configuration mode may extract a dynamic chain from an IR-DYN packet and convert the remainder of the corresponding packet into a general header compressed packet. The first configuration mode may transport the general header compressed packet without any change.

According to a second configuration mode (Configuration Mode #2) L6020, which is another embodiment of the present invention, the second configuration mode may extract only a static chain from an IR packet and convert the remainder of the corresponding packet into a general header compressed packet. The second configuration mode may extract a dynamic chain from an IR-DYN packet and convert the remainder of the corresponding packet into a general header compressed packet. The second configuration mode may transport the general header compressed packet without any change.

According to a third configuration mode (Configuration Mode #3) L6030, which is another embodiment of the present invention, the third configuration mode may extract a static chain from an IR packet and convert the remainder of the corresponding packet into an IR-DYN packet. The third configuration mode may transport the IR-DYN packet without any change and transport a general header compressed packet without any change.

FIG. 36 is a view showing a procedure of converting an IR packet into a general header compressed packet in a procedure of reconfiguring an RoHC packet to configure a new packet stream according to an embodiment of the present invention.

An IR packet L7010 according to an embodiment of the present invention may include packet type, context ID, Profile, CRC, Static Chain, Dynamic Chain, and/or Payload. Packet type may indicate type of the corresponding IR packet. For example, in this figure, the packet type of the IR packet may indicate 1111110D and the last D may indicate whether a dynamic chain is included in the corresponding packet. Context ID may use 8 bits or more bits. Context ID may identify a channel through which the corresponding packet is transported. Context ID may be named a context identifier (CID). When a compressor sends a packet having an uncompressed full header while a specific CID is added thereto first and sends subsequent packets while omitting header fields having static, dynamic, or inferred properties as the same CID, a decompressor may recover all RTP headers by adding the omitted field to the compression header received after the second packet with reference to initially stored header field information based on the CID. Profile may indicate a profile of the IR packet identified by the packet type. CRC may indicate a CRC code for error check. Static Chain may indicate information which is not almost changed during streaming. For example, IP version, IP source address, IP destination address, IP fragment flag, UDP source port, UDP destination port, etc. may be included in the static chain during IP streaming. Dynamic Chain may indicate information which is changed at any time but is maintained for a predetermined time. Payload may include data to be transported.

A general header compressed packet L7020 according to an embodiment of the present invention may include Time Stamp (TS), Sequence Number (SN), CRC, and/or Payload. A general header compressed packet according to an embodiment of the present invention may correspond to a UO-1 packet corresponding to packet type 1. Time Stamp (TS) may indicate time stamp information for time synchronization. Sequence Number (SN) may indicate information indicating sequence of packets. CRC may indicate a CRC code for error check. Payload may include data to be transported.

According to an embodiment of the present invention, a static chain and a dynamic chain may be extracted from the IR packet L7010 and the extracted static chain and dynamic chain may be transported through Out of Band L7030. The Time Stamp (TS) and the Sequence Number (SN) included in the general header compressed packet L7020 may be re-encoded using information of the dynamic chain included in the IR packet L7010. The CRC included in the general header compressed packet L7020 may be re-calculated separately from the CRC included in the IR packet L7010.

FIG. 37 is a view showing a procedure of converting an IR-DYN packet into a general header compressed packet in a procedure of reconfiguring an RoHC packet to configure a new packet stream according to an embodiment of the present invention.

An IR-DYN packet L8010 according to an embodiment of the present invention may include packet type, context ID, Profile, CRC, Dynamic Chain, and/or Payload. Packet type may indicate type of the corresponding IR-DYN packet. For example, in this figure, the packet type of the IR-DYN packet may indicate 11111000. Context ID may use 8 bits or more bits. Context ID may identify a channel through which the corresponding IR-DYN packet is transported. Profile may indicate a profile of the IR-DYN packet identified by the packet type. CRC may indicate a CRC code for error check. Dynamic Chain may indicate information which is changed at any time but is maintained for a predetermined time. Payload may include data to be transported.

A general header compressed packet L8020 according to an embodiment of the present invention may include Time Stamp (TS), Sequence Number (SN), CRC, and/or Payload, which were previously described.

According to an embodiment of the present invention, a dynamic chain may be extracted from the IR-DYN packet L8010 and the extracted dynamic chain may be transported through Out of Band L8030. The Time Stamp (TS) and the Sequence Number (SN) included in the general header compressed packet L8020 may be re-encoded using information of the dynamic chain included in the IR-DYN packet L8010. The CRC included in the general header compressed packet L8020 may be re-calculated separately from the CRC included in the IR-DYN packet L8010.

FIG. 38 is a view showing a procedure of converting an IR packet into an IR-DYN packet in a procedure of reconfiguring an RoHC packet to configure a new packet stream according to an embodiment of the present invention.

An IR packet L9010 and an IR-DYN packet L9020 according to an embodiment of the present invention were previously described in detail.

According to an embodiment of the present invention, packet type of the IR packet L9010 may be changed into a packet type value corresponding to the IR-DYN packet L9020. A static chain may be extracted from the IR packet L9010 and the extracted static chain may be transported through Out of Band L9030. The remaining fields included in the IR packet L9010 excluding the packet type and the static chain may be identically used in the IR-DYN packet L9020.

According to an embodiment of the present invention, encoding and calculation methods related to fields used in a procedure of reconfiguring an RoHC packet to configure a new packet stream may conform to a related standard document or other methods may be applied.

FIG. 39 is a view showing a configuration and recovery procedure of an RoHC packet stream in a first configuration mode (Configuration Mode #1) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L10010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain and a dynamic chain from the IR packet and extract a dynamic chain from the IR-DYN packet. The extracted static chain and dynamic chain may be transported through Out of Band L10030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L10020 may be transported through a data pipe and the extracted static chain and dynamic chain may be transported through Out of Band L10030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L10040), and detect a static chain and a dynamic chain corresponding to the packet stream to be received. The static chain and/or the dynamic chain may be received through Out of Band (Out of Band Reception, L10050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L10060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

FIG. 40 is a view showing a configuration and recovery procedure of an RoHC packet stream in a second configuration mode (Configuration Mode #2) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L11010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain from the IR packet and extract a dynamic chain from the IR-DYN packet. The extracted static chain and dynamic chain may be transported through Out of Band L11030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L11020 may be transported through a data pipe and the extracted static chain and dynamic chain may be transported through Out of Band L11030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L11040), and detect a static chain and a dynamic chain corresponding to the packet stream to be received. The static chain and/or the dynamic chain may be received through Out of Band (Out of Band Reception, L11050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L11060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

FIG. 41 is a view showing a configuration and recovery procedure of an RoHC packet stream in a third configuration mode (Configuration Mode #3) according to an embodiment of the present invention.

A configuration procedure of an RoHC packet stream in a transmitter according to an embodiment of the present invention is as follows.

A transmitter according to an embodiment of the present invention may detect an IR packet from an RoHC packet stream L12010 based on RoHC header information. Next, the transmitter may extract a static chain from the IR packet and convert the IR packet into an IR-DYN packet using the remainder of the IR packet excluding the extracted static chain. For all RoHC packet streams, the transmitter may replace a header of the IR packet with a header of the IR-DYN packet through the same procedure as the above-described procedure and extract a static chain. A reconfigured packet stream L12020 may be transported through a data pipe and the extracted static chain may be transported through Out of Band L12030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L12040), and detect a static chain corresponding to the packet stream to be received. The static chain may be received through Out of Band (Out of Band Reception, L12050). Next, the receiver may detect an IR-DYN packet from the pack stream transported through the data pipe. Next, the receiver may combine the detected IR-DYN packet with the static chain to configure an IR packet. The configured IR packet may be transported to an RoHC decompressor. In addition, the receiver may configure an RoHC packet stream L12060 including an IR packet, an IR-DYN packet, and/or a general header compressed packet. The configured RoHC packet stream may be transported to the RoHC decompressor. A receiver according to an embodiment of the present invention may use static chain and SN and/or Context ID of an IR-DYN packet to recover an RoHC packet stream.

FIG. 42 is a view showing a combination of information that can be delivered through Out of Band according to an embodiment of the present invention.

According to an embodiment of the present invention, a method of delivering a static chain and/or a dynamic chain extracted in a configuration procedure of an RoHC packet stream through Out of Band may mainly include a delivering method through signaling and a delivering method through a data pipe, through which a parameter necessary for system decoding is delivered. According to an embodiment of the present invention, the data pipe, through which the parameter necessary for the system decoding is delivered, may be named Base Data Pipe (DP).

As shown in this figure, a static chain and/or a dynamic chain may be delivered through signaling or Base DP. According to an embodiment of the present invention, a first transport mode (Transport Mode #1) to a third transport mode (Transport Mode #3) may be used in the first configuration mode (Configuration Mode #1) or the second configuration mode (Configuration Mode #2), and a fourth transport mode (Transport Mode #4) and a fifth third transport mode (Transport Mode #5) may be used in the third configuration mode (Configuration Mode #3)

According to an embodiment of the present invention, each configuration mode and transport mode may be switched and used through separate signaling based on a situation of the system, and only one configuration mode and one transport mode may be fixed and used according to a design procedure of the system.

As shown in this figure, in the first transport mode (Transport Mode #1), a static chain may be transported through signaling, a dynamic chain may be transported through signaling, and a general header compressed packet may be transported through Normal Data Pipe.

As shown in this figure, in the second transport mode (Transport Mode #2), a static chain may be transported through signaling, a dynamic chain may be transported through Base Data Pipe, and a general header compressed packet may be transported through Normal Data Pipe.

As shown in this figure, in the third transport mode (Transport Mode #3), a static chain may be transported through Base Data Pipe, a dynamic chain may be transported through Base Data Pipe, and a general header compressed packet may be transported through Normal Data Pipe.

As shown in this figure, in the fourth transport mode (Transport Mode #4), a static chain may be transported through signaling, a dynamic chain may be transported through Normal Data Pipe, and a general header compressed packet may be transported through Normal Data Pipe. At this time, the dynamic chain may be transported by an IR-DYN packet.

As shown in this figure, in the fifth transport mode (Transport Mode #5), a static chain may be transported through Base Data Pipe, a dynamic chain may be transported through Normal Data Pipe, and a general header compressed packet may be transported through Normal Data Pipe. At this time, the dynamic chain may be transported by an IR-DYN packet.

FIG. 43 is a view showing configuration of a descriptor including a static chain according to an embodiment of the present invention.

According to an embodiment of the present invention, a transport format for transport through signaling may be needed to transport a static chain through signaling, to which a descriptor form may correspond.

A descriptor including a static chain according to an embodiment of the present invention may include a descriptor_tag field, a descriptor_length field, a context_id field, a context_profile field, a static_chain_length field, and/or a static_chain( ) field.

The descriptor_tag field may indicate that this descriptor is a descriptor including a static chain.

The descriptor_length field may indicate a length of this descriptor.

The context_id field may indicate context ID for a corresponding RoHC packet stream. The length of context ID may be decided in an initial configuration procedure of the system. This field may be named context identifier information and identify a corresponding RoHC packet stream based on a static field or a dynamic field.

The context_profile field may indicate compression protocol information of a corresponding RoHC packet stream. That is, this field may indicate up to which protocol a header of an RoHC packet included in the corresponding RoHC packet stream has been compressed.

The static_chain_length field may indicate the length of following static chain( ) in unit of byte. In a case in which this descriptor includes only one static chain, this field may be replaced by the above-described descriptor_length field.

The static_chain( ) field may include information for the static chain.

FIG. 44 is a view showing configuration of a descriptor including a dynamic chain according to an embodiment of the present invention.

According to an embodiment of the present invention, a transport format for transport through signaling may be needed to transport a dynamic chain through signaling, to which a descriptor form may correspond.

A descriptor including a dynamic chain according to an embodiment of the present invention may include a descriptor_tag field, a descriptor_length field, a context_id field, a context_profile field, a dynamic_chain_length field, and/or a dynamic_chain( ) field.

The descriptor_tag field may indicate that this descriptor is a descriptor including a dynamic chain.

The descriptor_length field may indicate a length of this descriptor.

The context_id field may indicate context ID for a corresponding RoHC packet stream. The length of context ID may be decided in an initial configuration procedure of the system.

The context_profile field may indicate compression protocol information of a corresponding RoHC packet stream.

The dynamic_chain_length field may indicate the length of following dynamic chain( ) in unit of byte. In a case in which this descriptor includes only one dynamic chain, this field may be replaced by the above-described descriptor_length field The dynamic_chain( ) field may include information for the dynamic chain.

FIG. 45 is a view showing configuration of a packet format including a static chain and a packet format including a dynamic chain according to an embodiment of the present invention.

According to an embodiment of the present invention, a transport format for transport in a packet form may be needed to transport a static chain and/or a dynamic chain through Base DP, to which a packet format form shown in this figure may correspond.

In order to configure a static chain and/or a dynamic chain according to an embodiment of the present invention in a packet format, a header for informing of information about the corresponding static chain and/or dynamic chain may be added. The added header may include a Packet Type field, a Static/Dynamic chain Indicator field, and a Payload Length field. In a case in which a packet according to an embodiment of the present invention has a structure in which it is difficult to indicate a static chain and/or a dynamic chain in detail, the information of the above-described descriptor including the static chain or the dynamic chain may be included in a payload of this packet A packet format including a static chain according to an embodiment of the present invention may include a Packet Type field, a Static chain Indicator field, a Payload Length field, and/or a Static Chain Byte field.

The Packet Type field may indicate type information of this packet.

The Static chain Indicator field may indicate whether information constituting a payload is a static chain or a dynamic chain.

The Payload Length field may indicate the length of a payload including a static chain.

The Static Chain Byte field may indicate information of the static chain included in the payload of this packet.

A packet format including a dynamic chain according to an embodiment of the present invention may include a Packet Type field, a Dynamic chain Indicator field, a Payload Length field, and/or a Dynamic Chain Byte field.

The Packet Type field may indicate type information of this packet.

The Dynamic chain Indicator field may indicate whether information constituting a payload is a static chain or a dynamic chain.

The Payload Length field may indicate the length of a payload including a dynamic chain.

The Dynamic Chain Byte field may indicate information of the dynamic chain included in the payload of this packet.

FIG. 46 is a view showing a broadcast signal transmitting method according to an embodiment of the present invention.

A broadcast signal transmitting method according to an embodiment of the present invention may be performed in the following order. First, a compressor may compress a header of an IP packet included in an IP packet stream to generate an RoHC packet stream (SL17010). Next, the compressor may extract a first part of an RoHC packet included in the generated RoHC packet stream (SL17020). According to an embodiment of the present invention, the above-described first part may indicate a static field and/or a dynamic field of the RoHC packet, which was previously described in detail with reference to FIGS. 35, 39, 40, and 41. Next, the compressor may convert a second part of the RoHC packet into another type of an RoHC packet (SL17030). The second part may mean the remainder of the RoHC packet excluding the extracted first part. According to an embodiment of the present invention, an RoHC packet may be divided into three types, which will hereinafter be described. The above-described another type of the RoHC packet may mean an RoHC packet having one of the three types, which was previously described in detail with reference to FIGS. 36, 37, and 38. Next, the compressor may reconfigure a new packet stream including the converted another type of the RoHC packet (SL17040), which was previously described in detail with reference to FIGS. 39, 40, and 41. Next, the compressor may transport the reconfigured packet stream through a first channel and transport the above-described first part through a second channel (SL17050), which was previously described in detail with reference to FIGS. 42 to 45.

According to another embodiment of the present invention, the above-described RoHC packet may correspond to any one selected from among a first packet including first header information changed whenever the packet is changed during streaming and a payload, a second packet including second header information changed at predetermined intervals as the packet is changed, the first header information, and the payload, and a third packet including third header information unchanged although the packet is changed during streaming, the first header information, and the payload. The first header information may mean the remainder of all headers of the RoHC packet excluding a static field and a dynamic field. Consequently, the first packet including the first header information and the payload may indicate a general header compressed packet. The second header information may mean a dynamic field. Consequently, the second packet including the second header information, the first header information, and the payload may indicate an IR-DYN packet. The third header information may mean a static field. Consequently, the third packet including the third header information, the first header information, and the payload may indicate an IR packet. According to an embodiment of the present invention, the IR packet may include or may not include a dynamic field. According to an embodiment of the present invention, the static field may be named a static chain, and the dynamic field may be named a dynamic chain, which was previously described in detail with reference to FIGS. 30 to 32.

According to another embodiment of the present invention, the third packet may further include second header information, and at the above-described extraction step the compressor may extract the second header information and the third header information from the third packet included in the generated RoHC packet stream and extract the second header information from the second packet included in the generated RoHC packet stream. In addition, at the above-described conversion step, the compressor may convert the remainder of the third packet excluding the extracted second header information and third header information into the first packet and convert the remainder of the second packet excluding the extracted second header information into the first packet, which was previously described in detail with reference to FIGS. 36 and 39.

According to another embodiment of the present invention, the third packet may further include second header information, and at the above-described extraction step the compressor may extract the third header information from the third packet included in the generated RoHC packet stream. In addition, at the above-described conversion step, the compressor may convert the remainder of the third packet excluding the extracted third header information into the second packet, which was previously described in detail with reference to FIGS. 38 and 41.

According to another embodiment of the present invention, at the above-described extraction step the compressor may extract the third header information from the third packet included in the generated RoHC packet stream and extract the second header information from the second packet included in the generated RoHC packet stream. In addition, at the above-described conversion step, the compressor may convert the remainder of the third packet excluding the extracted third header information into the first packet and convert the remainder of the second packet excluding the extracted second header information into the first packet, which was previously described in detail with reference to FIGS. 37 and 40.

According to another embodiment of the present invention, the above-described second channel may include a signaling channel for transporting signaling information and a system channel for transporting information necessary for system decoding. Second header information and/or third header information according to an embodiment of the present invention may be transported through the signaling channel or the system channel. According to an embodiment of the present invention, the above-described signaling channel may indicate an Out of Band channel, which may be a channel for transporting signaling information, and the system channel may indicate an Out of Band channel, which may be a base data pipe, which was previously described in detail with reference to FIG. 42.

According to another embodiment of the present invention, in a case in which the above-described second header information or third header information is transported through the signaling channel, the second header information or the third header information may be transported while being included in a sub element. A sub element according to an embodiment of the present invention may include context identifier information for identifying a corresponding RoHC packet stream based on the above-described second header information or third header information and context profile information indicating up to which protocol a header of an RoHC packet included in the corresponding RoHC packet stream based on the second header information or the third header information has been compressed. A sub element according to an embodiment of the present invention may indicate a descriptor, which was previously described in detail with reference to FIG. 43.

According to a further embodiment of the present invention, in a case in which the above-described second header information or third header information is transported through the system channel, the second header information or the third header information may be transported while being included in a payload of a packet. A packet according to an embodiment of the present invention may include packet type information indicating type information of the packet, indicator information indicating whether information included in a payload is second header information or third header information, and/or length information indicating the length of the payload, which was previously described in detail with reference to FIG. 45.

FIG. 47 is a view showing a broadcast signal receiving method according to an embodiment of the present invention.

A broadcast signal receiving method according to an embodiment of the present invention may be performed in the following order. First, a decompressor may receive a reconfigured packet stream through a first channel (SL18010). A reconfigured packet stream according to an embodiment of the present invention may indicate a new packet stream obtained by extracting a first part of an RoHC packet included in an RoHC packet stream, converting a second part of the RoHC packet into another type of an RoHC packet, and reconfiguring a new packet stream including the converted another type of the RoHC packet. Next, the decompressor may receive the extracted first part through a second channel, which was previously described in detail with reference to FIGS. 35 to 41 (SL18020). Next, the decompressor may recover the received reconfigured packet stream to an original RoHC packet stream using the received first part (SL18030), which was previously described in detail with reference to FIGS. 39 to 41. Next, the decompressor may decompress a header of the RoHC packet included in the recovered RoHC packet stream to generate an IP packet stream (SL18040), which was previously described in detail with reference to FIG. 34. Next, the decompressor may process the generated IP packet stream to acquire broadcast data (SL18050).

According to another embodiment of the present invention, the above-described RoHC packet may correspond to any one selected from among a first packet including first header information changed whenever the packet is changed during streaming and a payload, a second packet including second header information changed at predetermined intervals as the packet is changed, the first header information, and the payload, and a third packet including third header information unchanged although the packet is changed during streaming, the first header information, and the payload. The first header information may mean the remainder of all headers of the RoHC packet excluding a static field and a dynamic field. Consequently, the first packet including the first header information and the payload may indicate a general header compressed packet. The second header information may mean a dynamic field. Consequently, the second packet including the second header information, the first header information, and the payload may indicate an IR-DYN packet. The third header information may mean a static field. Consequently, the third packet including the third header information the first header information, and the payload may indicate an IR packet. According to an embodiment of the present invention, the IR packet may include or may not include a dynamic field. According to an embodiment of the present invention, the static field may be named a static chain, and the dynamic field may be named a dynamic chain, which was previously described in detail with reference to FIGS. 30 to 32.

According to another embodiment of the present invention, the third packet may further include second header information, and at the above-described recovery step, in a case in which the second header information and the third header information received while being included in the above-described first part have the same sequence number, the decompressor may detect a first packet having the same sequence number as the second header information and the third header information from packets included in the received reconfigured packet stream and combine the second header information and the third header information with the detected first packet to recover a third packet. On the other hand, in a case in which the second header information and the third header information received while being included in the above-described first part have different sequence numbers, the decompressor may detect a first packet having the same sequence number as the second header information from packets included in the received reconfigured packet stream and combine the second header information with the detected first packet to recover a second packet. Through this procedure, the decompressor may recover the received reconfigured packet stream to an original RoHC packet stream, which was previously described in detail with reference to FIGS. 36 and 39.

According to another embodiment of the present invention, the third packet may further include second header information, and at the above-described recovery step the decompressor may detect a second packet having the same sequence number as the third header information received while being included in the first part from packets included in the received reconfigured packet stream and combine the received second header information with the detected second packet to recover a third packet. Through this procedure, the decompressor may recover the received reconfigured packet stream to an original RoHC packet stream, which was previously described in detail with reference to FIGS. 38 and 41.

According to another embodiment of the present invention, at the above-described recovery step the decompressor may detect a first packet having the same sequence number as the third header information received while being included in the first part from packets included in the received reconfigured packet stream and combine the received third header information with the detected first packet to recover a third packet. In addition, the decompressor may detect a first packet having the same sequence number as the second header information received while being included in the first part from packets included in the received reconfigured packet stream and combine the received second header information with the detected first packet to recover a second packet. Through this procedure, the decompressor may recover the received reconfigured packet stream to an original RoHC packet stream, which was previously described in detail with reference to FIGS. 37 and 40.

According to another embodiment of the present invention, the above-described second channel may include a signaling channel for transporting signaling information and a system channel for transporting information necessary for system decoding. Second header information and/or third header information according to an embodiment of the present invention may be transported through the signaling channel or the system channel. According to an embodiment of the present invention, the above-described signaling channel may indicate an Out of Band channel, which may be a channel for transporting signaling information, and the system channel may indicate an Out of Band channel, which may be a base data pipe, which was previously described in detail with reference to FIG. 42.

According to another embodiment of the present invention, in a case in which the above-described second header information or third header information is transported through the signaling channel, the second header information or the third header information may be transported while being included in a sub element. A sub element according to an embodiment of the present invention may include context identifier information for identifying a corresponding RoHC packet stream based on the above-described second header information or third header information and context profile information indicating up to which protocol a header of an RoHC packet included in the corresponding RoHC packet stream based on the second header information or the third header information has been compressed. A sub element according to an embodiment of the present invention may indicate a descriptor, which was previously described in detail with reference to FIG. 43.

According to a further embodiment of the present invention, in a case in which the above-described second header information or third header information is transported through the system channel, the second header information or the third header information may be transported while being included in a payload of a packet. A packet according to an embodiment of the present invention may include packet type information indicating type information of the packet, indicator information indicating whether information included in a payload is second header information or third header information, and/or length information indicating the length of the payload, which was previously described in detail with reference to FIG. 45.

FIG. 48 is a view showing the structure of a broadcast signal transmitting apparatus according to an embodiment of the present invention.

A broadcast signal transmitting apparatus L19060 according to an embodiment of the present invention may include an RoHC compressor L19010, an extraction unit L19020, a conversion unit L19030, a reconfiguration unit L19040, and/or a transport unit L19050.

The RoHC compressor L19010 may compress a header of an IP packet included in an IP packet stream to generate an RoHC packet stream.

The extraction unit L19020 may extract a first part of an RoHC packet included in the generated RoHC packet stream.

The conversion unit L19030 may convert a second part of the RoHC packet into another type of an RoHC packet.

The reconfiguration unit L19040 may reconfigure a new packet stream including the converted another type of the RoHC packet.

The transport unit L19050 may transport the reconfigured packet stream through a first channel and transport the first part through a second channel.

The components of the broadcast signal transmitting apparatus L19060 according to the embodiment of the present invention were previously described in detail with reference to FIGS. 34 and 46.

FIG. 49 is a view showing the structure of a broadcast signal receiving apparatus according to an embodiment of the present invention.

A broadcast signal receiving apparatus L20060 according to an embodiment of the present invention may include a first receiving unit L20010, a second receiving unit L20020, a recovering unit L20030, an RoHC decompressor L20040, and/or an IP packet processing unit L20050.

The first receiving unit L20010 may receive a reconfigured packet stream through a first channel. The reconfigured packet stream may be a new packet stream obtained by extracting a first part of an RoHC packet included in an RoHC packet stream, converting a second part of the RoHC packet into another type of an RoHC packet, and reconfiguring a new packet stream including the converted another type of the RoHC packet.

The second receiving unit L20020 may receive the extracted first part through a second channel.

The recovering unit L20030 may recover the received reconfigured packet stream to an original RoHC packet stream using the received first part.

The RoHC decompressor L20040 may decompress a header of the RoHC packet included in the recovered RoHC packet stream to generate an IP packet stream.

The IP packet processing unit L20050 may process the generated IP packet stream to acquire broadcast data.

The components of the broadcast signal receiving apparatus L20060 according to the embodiment of the present invention were previously described in detail with reference to FIGS. 34 and 47.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR THE INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A broadcast signal transmitting method comprising:
compressing headers of first Internet Protocol (IP) packets included in a first IP packet stream to generate a first Initialization Refresh (IR) packet, a first IR dynamic (IR-DYN) packet and first compressed packets and compressing headers of second IP packets included in a second IP packet stream to generate a second IR packet, a second IR-DYN packet and second compressed packets, wherein the first IR packet includes static chain information and dynamic chain information and the first IR-DYN packet includes dynamic chain information and wherein the second IR packet includes static chain information and dynamic chain information and the second IR-DYN packet includes dynamic chain information;
first processing the first IR packet, the first IR-DYN packet and the first compressed packets in a first mode and second processing the second IR packet, the second IR-DYN packet and the second compressed packets in a second mode,
wherein the first processing comprises:
extracting first context information from the first IR packet and the first IR-DYN packet, wherein the extracted first context information includes the static chain information and the dynamic chain information in the first IR packet and the dynamic chain information in the first IR-DYN packet, and
converting the first IR packet and the first IR-DYN packet to first compressed packets,
wherein the second processing comprises:
extracting second context information from the second IR packet, wherein the extracted second context information includes the static chain information in the second IR packet, and
converting the second IR packet to a second IR-DYN packet;
generating first signaling data containing the first context information and first mode information for identifying that is the first mode and second signaling data containing the second context information and second mode information for identifying that is the second mode; and
transmitting a broadcast signal including the first signaling data, the second signaling data, first service data, and second service data,
wherein the first service data include the generated first compressed packets and the converted first compressed packets and are carried via a data pipe, and
wherein the second service data include the generated second IR-DYN packet, the converted second IR-DYN packet and the generated second compressed packets and are carried via another data pipe other than the data pipe.

2. The method of claim 1, wherein the first signaling data further include information for identifying a context and information for identifying a range of protocols used to compress the first IP packet stream and wherein the second signaling data further include information for identifying a context and information for identifying a range of protocols used to compress the second IP packet stream.

3. A broadcast signal receiving method comprising:
receiving a broadcast signal including first signaling data, second signaling data, first service data, and second service data, wherein the first signaling data include first context information and first mode information for identifying that is a first mode, wherein the second signaling data include second context information and second mode information for identifying that is a second mode, wherein the first service data are carried via a data pipe and wherein the second service data are carried via another data pipe other than the data pipe;
first processing the first signaling data and the first service data in response to the first mode information identifying that is the first mode and second processing the second signaling data and the second service data in response to the second mode information identifying that is the second mode,
wherein the first processing comprises:
obtaining the first context information from the first signaling data, wherein the received first service data include first compressed packets and wherein the obtained first context information includes static chain information and dynamic chain information for recovering a first IR packet and dynamic chain information for recovering a first IR-DYN packet, and
recovering the first IR packet based on the obtained static chain information and dynamic chain information and a first compressed packet of the first compressed packets and the first IR-DYN packet based on the obtained dynamic chain information and a first compressed packet of the first compressed packets, and
wherein the second processing comprises:
obtaining the second context information from the second signaling data, wherein the received second service data include second IR-DYN packets and second compressed packets and wherein the obtained second context information includes static chain information for recovering a second IR packet, and
recovering the second IR packet based on the obtained static chain information and a second IR-DYN packet of the second IR-DYN packets; and
decompressing the processed first service data to generate a first Internet Protocol (IP) packet stream including first IP packets in the first mode and decompressing the processed second service data to generate a second IP packet stream including second IP packets in the second mode.

4. The method of claim 3, wherein the first signaling data further include information for identifying a context and information for identifying a range of protocols used to compress the first IP packet stream and wherein the second signaling data further include information for identifying a context and information for identifying a range of protocols used to compress the second IP packet stream.

5. The method of claim 3, further comprising:
processing one of the generated first IP packet stream or the generated second IP packet stream to acquire broadcast data.

6. A broadcast signal transmitting apparatus comprising:
a Robust Header Compression (RoHC) compressor to compress headers of first Internet Protocol (IP) packets included in a first IP packet stream to generate a first Initialization Refresh (IR) packet, a first IR dynamic (IR-DYN) packet and first compressed packets and compressing headers of second IP packets included in a second IP packet stream to generate a second IR packet, a second IR-DYN packet and second compressed packets,
wherein the first IR packet includes static chain information and dynamic chain information and the first IR-DYN packet includes dynamic chain information and wherein the second IR packet includes static chain information and dynamic chain information and the second IR-DYN packet includes dynamic chain information;
a processor to perform first processing on the first IR packet, the first IR-DYN packet and the first compressed packets in a first mode and perform second processing on the second IR packet, the second IR-DYN packet and the second compressed packets in a second mode,
wherein the first processing is to:
extract first context information from the first IR packet and the first IR-DYN packet, wherein the extracted first context information includes the static chain information and the dynamic chain information in the first IR packet and the dynamic chain information in the first IR-DYN packet, and
convert the first IR packet and the first IR-DYN packet to first compressed packets,
wherein the second processing is to:
extract second context information from the second IR packet, wherein the extracted second context information includes the static chain information in the second IR packet, and
convert the second IR packet to a second IR-DYN packet;
a signaling packet generator to generate first signaling data containing the first context information and first mode information for identifying that is the first mode and second signaling data containing the second context information and second mode information for identifying that is the second mode; and
a transporter to transmit a broadcast signal including the first signaling data, the second signaling data, first service data and second service data,
wherein the first service data include the generated first compressed packets and the converted first compressed packets and are carried via a data pipe, and
wherein the second service data include the generated second IR-DYN packet, the converted second IR-DYN packet and the generated second compressed packets and are carried via another data pipe other than the data pipe.

7. The apparatus of claim 6, wherein the first signaling data further include information for identifying a context and information for identifying a range of protocols used to compress the first IP packet stream and wherein the second signaling data further include information for identifying a context and information for identifying a range of protocols used to compress the second IP packet stream.

8. A broadcast signal receiving apparatus comprising:
a tuner to receive a broadcast signal including first signaling data, second signaling data, first service data and second service data, wherein the first signaling data include first context information and first mode information for identifying that is a first mode, wherein the second signaling data include second context information and second mode information for identifying that is a second mode, wherein the first service data are carried via a data pipe and wherein the second service data are carried via another data pipe other than the data pipe;
a processor to perform first processing on the first signaling data and the first service data in response to the first mode information identifying that is the first mode and second processing on the second signaling data and the second service data in response to the second mode information identifying that is the second mode,
wherein the first processing is to:
obtain the first context information from the first signaling data, wherein the received first service data include first compressed packets and wherein the obtained first context information includes static chain information and dynamic chain information for recovering a first IR packet and dynamic chain information for recovering a first IR-DYN packet, and
recover the first IR packet based on the obtained static chain information and dynamic chain information and a first compressed packet of the first compressed packets and the first IR- DYN packet based on the obtained dynamic chain information and a first compressed packet of the first compressed packets, and
wherein the second processing is to:
obtain the second context information from the second signaling data, wherein the received second service data include second IR-DYN packets and second compressed packets and wherein the obtained second context information includes static chain information for recovering a second IR packet, and
recover the second IR packet based on the obtained static chain information and a second IR-DYN packet of the second IR-DYN packets; and
a decompressor to perform decompressing on the processed first service data to generate a first IP packet stream including first IP packets in the first mode and decompressing on the processed second service data to generate a second IP packet stream including second IP packets in the second mode.

9. The apparatus of claim 8, wherein the first signaling data further include information for identifying a context and information for identifying a range of protocols used to compress the first IP packet stream and wherein the second signaling data further include information for identifying a context and information for identifying a range of protocols used to compress the second IP packet stream.

10. The apparatus of claim 8, further comprising:
an another processor to process one of the generated first IP packet stream or the generated second IP packet stream to acquire broadcast data.

* * * * *